(12) United States Patent
Roeda et al.

(10) Patent No.: US 10,738,853 B2
(45) Date of Patent: Aug. 11, 2020

(54) DAMPER AND ASSEMBLY

(71) Applicant: Vibracoustic USA, Inc., South Haven, MI (US)

(72) Inventors: Tristan J. Roeda, South Haven, MI (US); Erich L. Merrill, Zeeland, MI (US)

(73) Assignee: Vibracoustic USA, Inc., South Haven, MI (US)

( * ) Notice: Subject to any disclaimer, the term of this patent is extended or adjusted under 35 U.S.C. 154(b) by 228 days.

(21) Appl. No.: 16/010,792

(22) Filed: Jun. 18, 2018

(65) Prior Publication Data

US 2019/0048960 A1 Feb. 14, 2019

Related U.S. Application Data

(60) Provisional application No. 62/542,853, filed on Aug. 9, 2017.

(51) Int. Cl.
| | |
|---|---|
| *F16F 7/10* | (2006.01) |
| *F16F 7/108* | (2006.01) |
| *F16F 7/104* | (2006.01) |
| *B60N 2/80* | (2018.01) |
| *B60N 2/879* | (2018.01) |
| *F16M 13/02* | (2006.01) |

(52) U.S. Cl.
CPC .............. *F16F 7/108* (2013.01); *B60N 2/80* (2018.02); *B60N 2/879* (2018.02); *F16F 7/104* (2013.01); *F16M 13/02* (2013.01); *B60N 2002/899* (2018.02); *F16F 2222/08* (2013.01)

(58) Field of Classification Search
CPC .................................. F16F 7/104; F16F 7/108
See application file for complete search history.

(56) References Cited

U.S. PATENT DOCUMENTS

| 5,326,324 A * | 7/1994 | Hamada | F16F 15/1442 464/180 |
|---|---|---|---|
| 6,991,077 B2 * | 1/2006 | Maeno | F16F 7/108 188/378 |
| 7,264,097 B2 * | 9/2007 | Yasumoto | F16F 7/108 188/379 |

(Continued)

FOREIGN PATENT DOCUMENTS

| DE | 102014206232 A1 | 10/2015 |
|---|---|---|
| DE | 102014018212 A1 | 6/2016 |

(Continued)

OTHER PUBLICATIONS

European Search Report EP18186911, dated Jan. 15, 2019.

*Primary Examiner* — Nicholas J Lane
(74) *Attorney, Agent, or Firm* — Fishman Stewart PLLC

(57) ABSTRACT

A damper includes a body and a movement limiter. A movement limiter may extend from the body. In embodiments, a movement limiter may include a plurality of ribs that may be configured for contacting an inner surface of an aperture or recess of a bracket to limit movement of the body relative to said bracket. A plurality of connecting members may extend from the body. The plurality of connecting members may connect the body with the bracket. The plurality of connecting members may include substantially T-shaped or bow tie-shaped configurations.

17 Claims, 27 Drawing Sheets

(56) References Cited

U.S. PATENT DOCUMENTS

| | | | | |
|---|---|---|---|---|
| 2015/0159721 | A1* | 6/2015 | Okubo | B60N 2/68 297/404 |
| 2016/0339817 | A1* | 11/2016 | Mizobata | B60N 2/80 |
| 2017/0370438 | A1 | 12/2017 | Cabuk et al. | |
| 2019/0360549 | A1* | 11/2019 | Sohn | F16F 7/108 |

FOREIGN PATENT DOCUMENTS

| | | |
|---|---|---|
| EP | 2871093 A1 | 5/2015 |
| WO | 2017148707 A1 | 9/2017 |

* cited by examiner

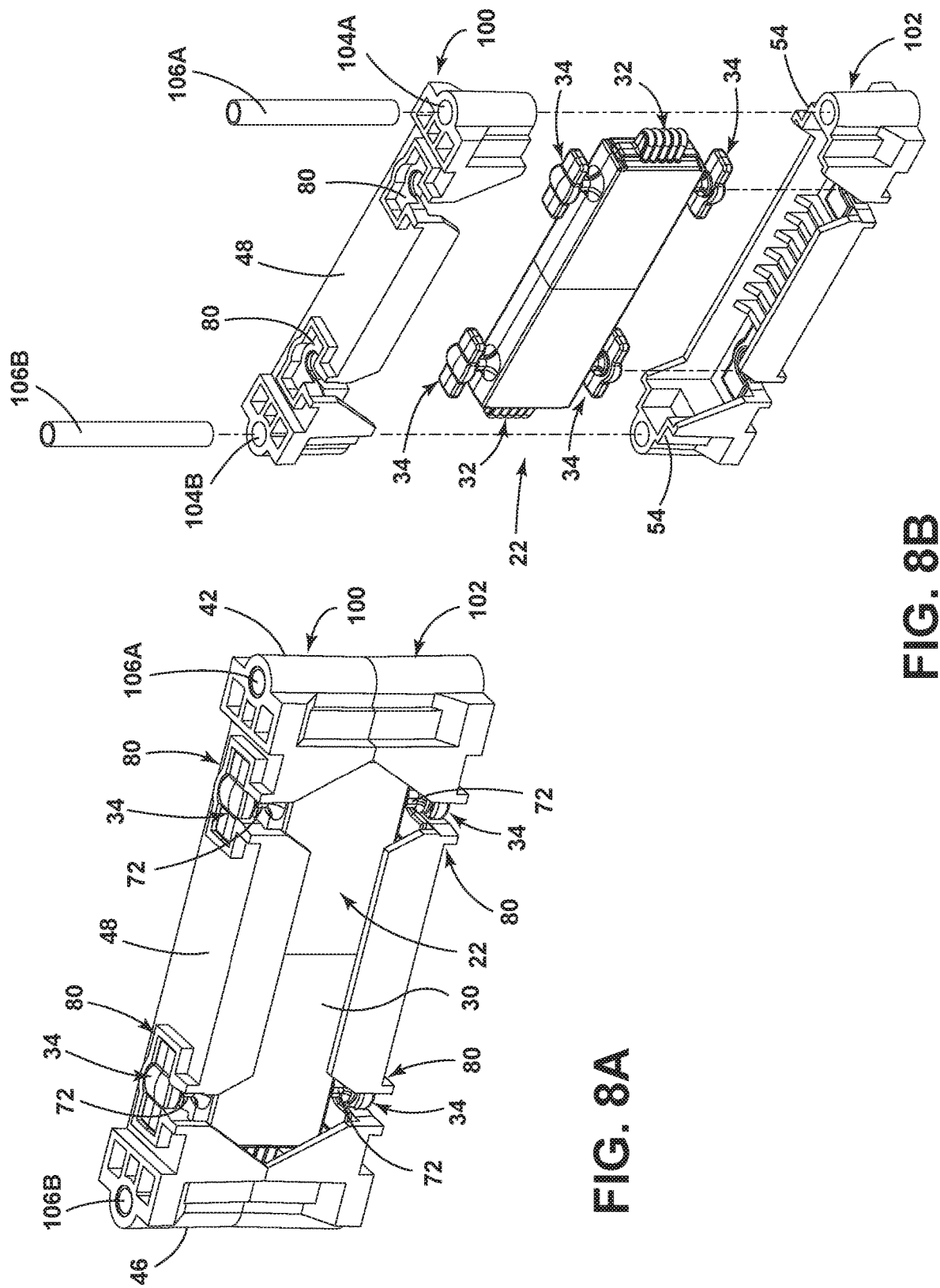

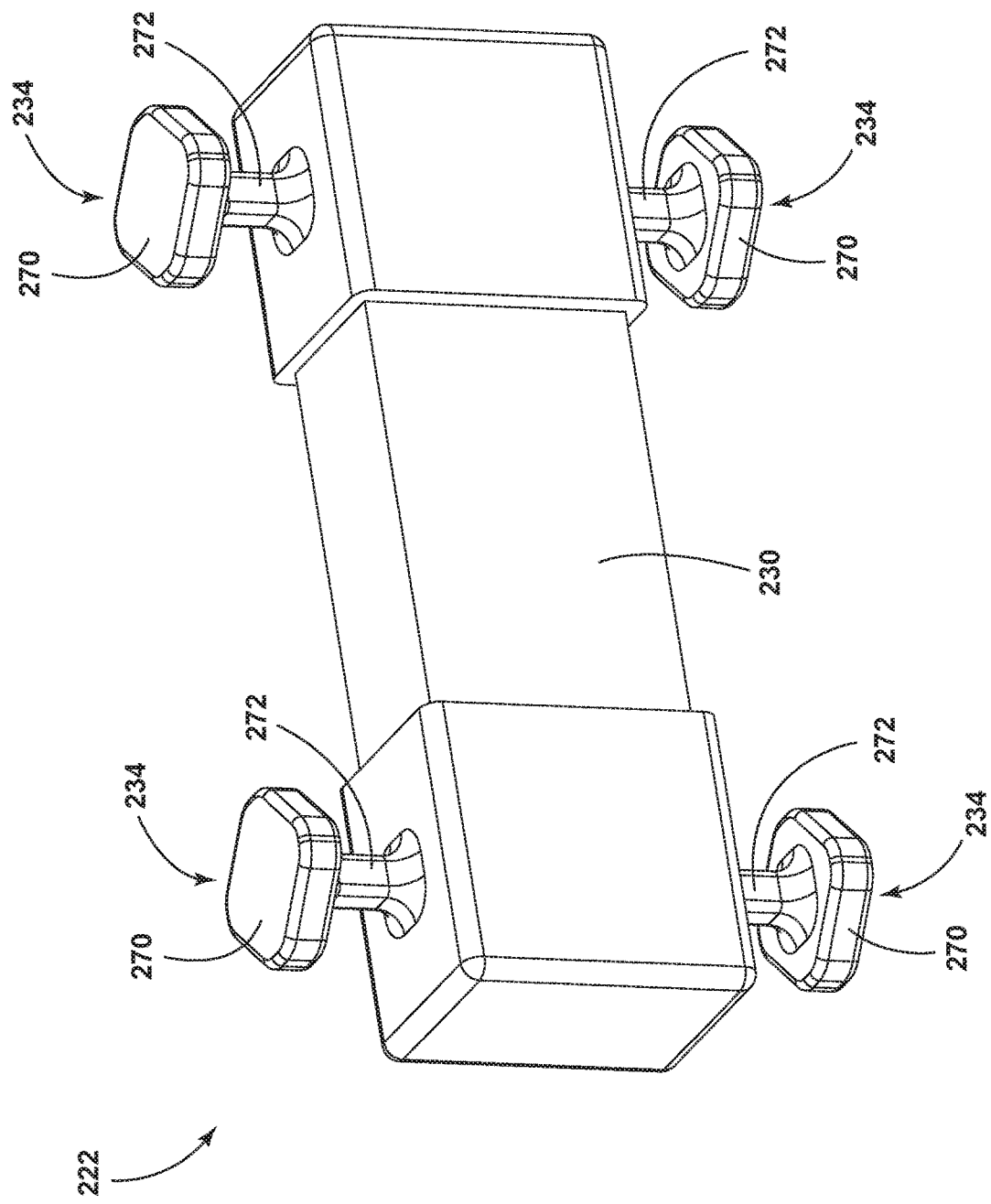

DAMPER AND ASSEMBLY

CROSS-REFERENCE TO RELATED APPLICATION

This application claims the benefit of U.S. Provisional Patent Application Ser. No. 62/542,853, filed on Aug. 9, 2017, the disclosure of which is hereby incorporated herein by reference in its entirety.

TECHNICAL FIELD

The present disclosure generally relates to dampers, including dampers that may be used in connection with vehicles to reduce noise and/or vibration.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

With some dampers, certain portions may be subject to forces that may result in undesirable wear or fatigue. Some dampers may produce an undesirable amount of noise. Some dampers may involve relatively complex assembly processes.

There is a desire for solutions/options that minimize or eliminate one or more challenges or shortcomings of dampers. The foregoing discussion is intended only to illustrate examples of the present field and should not be taken as a disavowal of scope.

SUMMARY

In embodiments, a damper may include a body and a movement limiter. A movement limiter may extend from the body. A movement limiter may include a plurality of ribs that may be configured for contacting an inner surface of an aperture or recess of a bracket to limit movement of the body relative to said bracket. A plurality of connecting members may extend from the body. The plurality of connecting members may connect the body with the bracket. The plurality of connecting members may include substantially T-shaped or bow tie-shaped configurations.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIG. 1A is a side view generally illustrating portions of embodiments of a damper assembly according to teachings of the present disclosure.

FIGS. 1B, 2A, and 2B are cross-sectional views generally illustrating portions of embodiments of dampers and brackets according to teachings of the present disclosure.

FIGS. 8A and 8B are a perspective view and an exploded perspective view generally illustrating portions of embodiments of dampers and brackets according to teachings of the present disclosure.

FIGS. 15A, 15B, and 15C are perspective views generally illustrating portions of damper assemblies according to teachings of the present disclosure.

DETAILED DESCRIPTION

Figure 1:
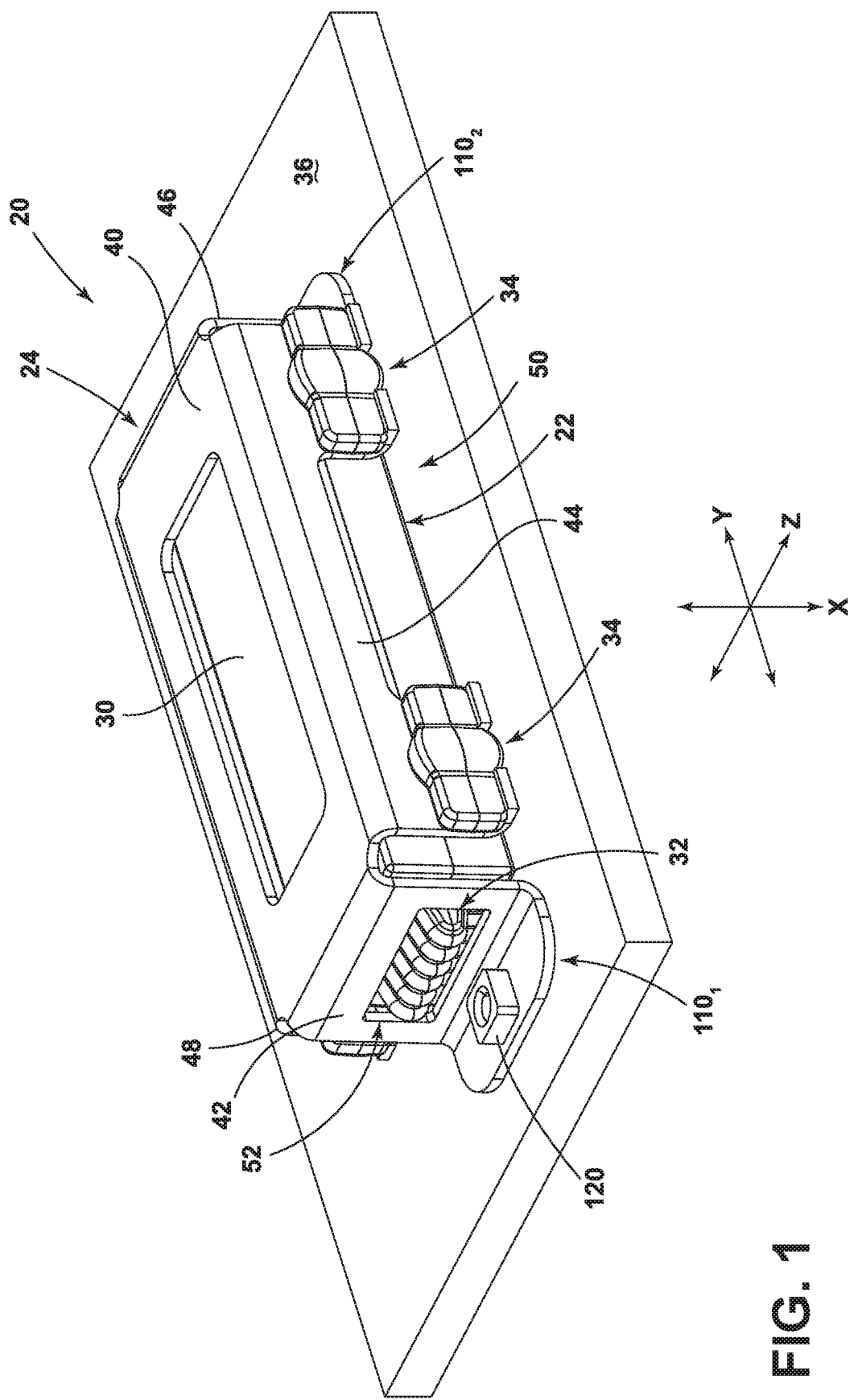
FIG. 1 is a perspective view generally illustrating portions of embodiments of a damper assembly according to teachings of the present disclosure.
Figure 2:
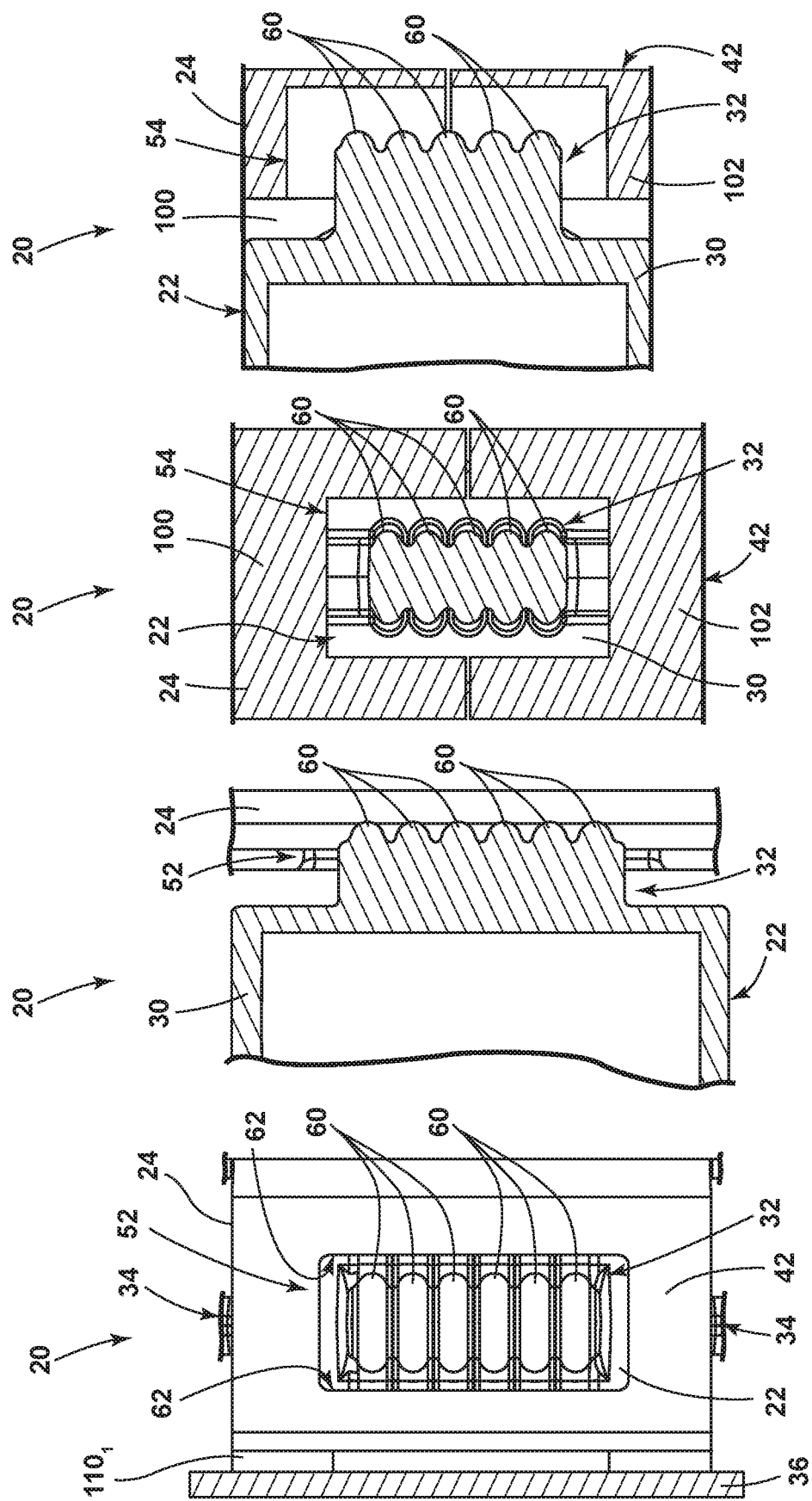
Figure 3:
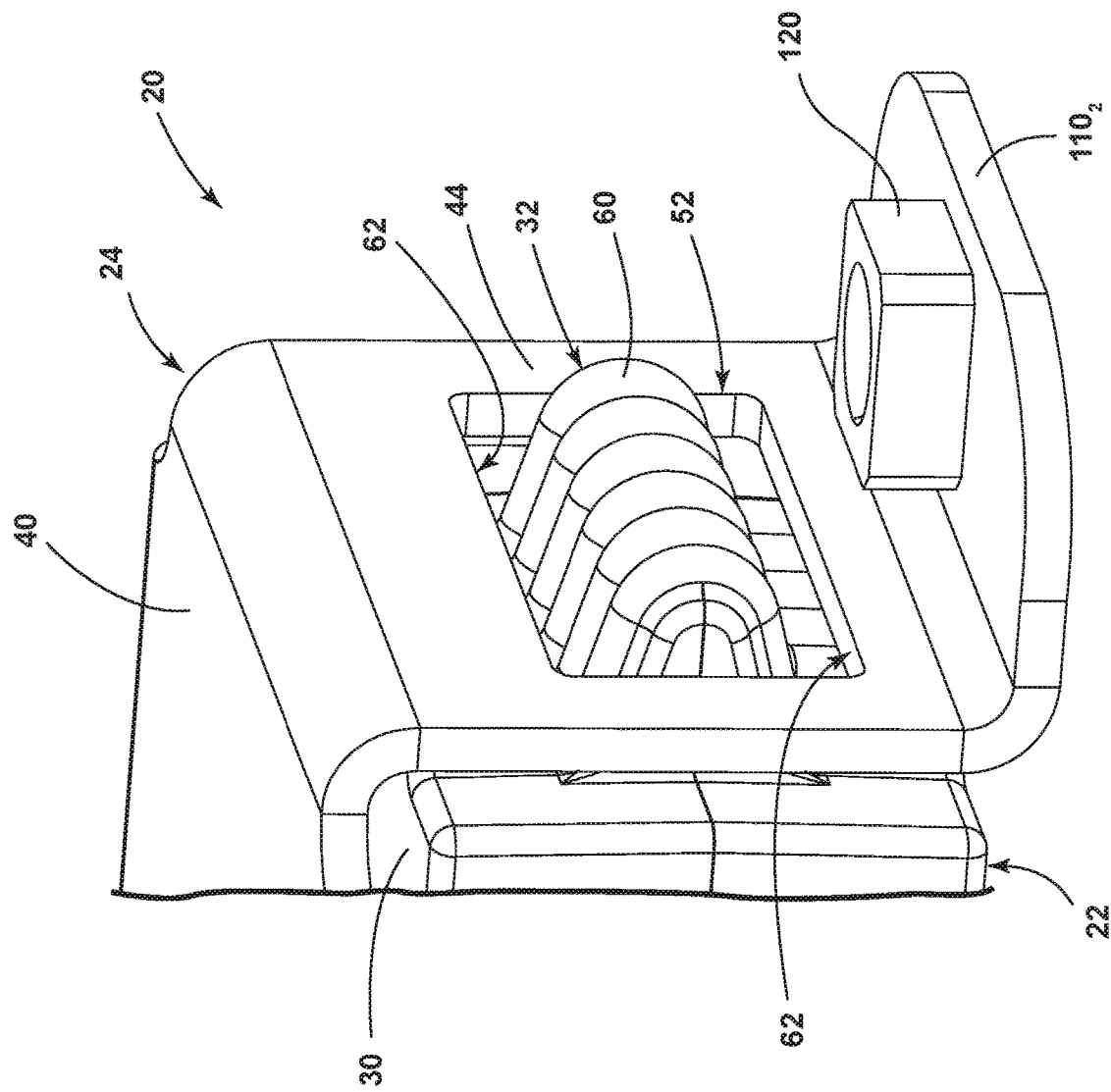
FIGS. 3 and 4 are perspective views generally illustrating portions of embodiments of dampers and brackets according to teachings of the present disclosure.

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Some dampers, such as dampers used in a vehicle environment, may use blunt contact between planar surfaces as a travel limitation. Travel limitations may be utilized to improve an overall durability of working rubber. Dampers contacting panels in a vehicle may include or be connected to felt/flock tape and/or rubber pads to reduce noise.

In embodiments, such as generally illustrated in FIGS. 1, 1A, 1B, 2A, 2B, 3, 4, and 5, a damper assembly 20 may include a damper 22 and/or a bracket 24. A damper 22 may include a body or mass 30, one or movement limiters 32, and/or one or more connecting members 34. A damper 22 may be connected with a bracket 24 via one or more connecting members 34 such that the body 30 may move, at least to some degree, relative to the bracket 24 (e.g., in an X-direction, which may include fore and aft directions). A damper 22 may include one or more of a variety of shapes, sizes, configurations, and/or materials. For example and without limitation, a damper 22 may include a resilient material (e.g., a rubber) and/or a body 30 may include a resilient material formed or disposed around a mass, such as a mass of metal.

With embodiments, a bracket 24 may be configured for connecting a damper assembly 20 to a mounting component or surface 36, such as a vehicle component or structure. A bracket 24 may include one or more of a variety of shapes, sizes, configurations, and/or materials. For example and without limitation, a bracket 24 may include a metal, such as steel (see, e.g., FIGS. 1, 1A, and 1B) and/or may include plastic (see, e.g., FIGS. 2A and 2B). A bracket 24 may include one or more side walls, such as a first side wall 40, a second side wall 42, a third side wall 44, a fourth side wall 46, and/or a fifth side wall 48. The second side wall 42, the third side wall 44, the fourth side wall 46, and the fifth side wall 48 may extend from the first side wall 40 (e.g., perpendicularly), such as to generally form a rectangular prism configuration. A bracket 24 may include an open side 50 that may be disposed opposite the first side wall 40. A bracket 24 may include one or more apertures 52 that may be configured to engage and/or at least partially receive a movement limiter. As generally illustrated in FIGS. 1, 1A, 1B, 3, and 4, an aperture 52 may, for example and without limitation, be disposed in and/or extend through the second side wall 42 and/or the fourth side wall 46 (e.g., at opposite sides of the bracket 24). With embodiments, a bracket 24 may include one or more recesses 54 that may, for example, be disposed or formed at an inner surface of bracket 24, such as at inner surfaces of the second side wall 42 and/or the fourth side wall 46 (see, e.g., FIGS. 2A, 2B, and 5).

In embodiments, a movement limiter 32 may be configured to restrict movement of the body 30 relative to the bracket 24. For example and without limitation, a movement limiter 32 may impede or restrict movement of the body 30 toward the first side wall 40 and/or away from the first side wall 40 (e.g., fore and/or aft movement). In embodiments, a movement limiter 32 may impede or restrict movement in one or more other directions (e.g., in Z-directions), which may, with some examples, be parallel with a vertical direction), such as under large loads. A movement limiter 32 may extend from the body 30 and at least partially into an aperture 52 or recess 54 of the bracket 24. For example and without limitation, a movement limiter 32 may extend into and through an aperture 52 of a bracket 24. A movement limiter 32 may include one or more of a variety of shapes, sizes, configurations, and/or materials. For example and without limitation, a movement limiter 32 may include a generally triangular configuration and/or may include a plurality of ribs 60 that may be spaced from each other, such as in a Z-direction (e.g., a movement limiter 32 may include a castellated configuration). A plurality of ribs 60 may include, for example only, six ribs. The ribs 60 may be disposed such that upon movement of the body 30 (e.g., in an X-direction), the ribs 60 contact an inner surface or edge 62 of the aperture 52 or recess 54 of the bracket 24 and restrict additional movement of the body 30.

Figure 4:
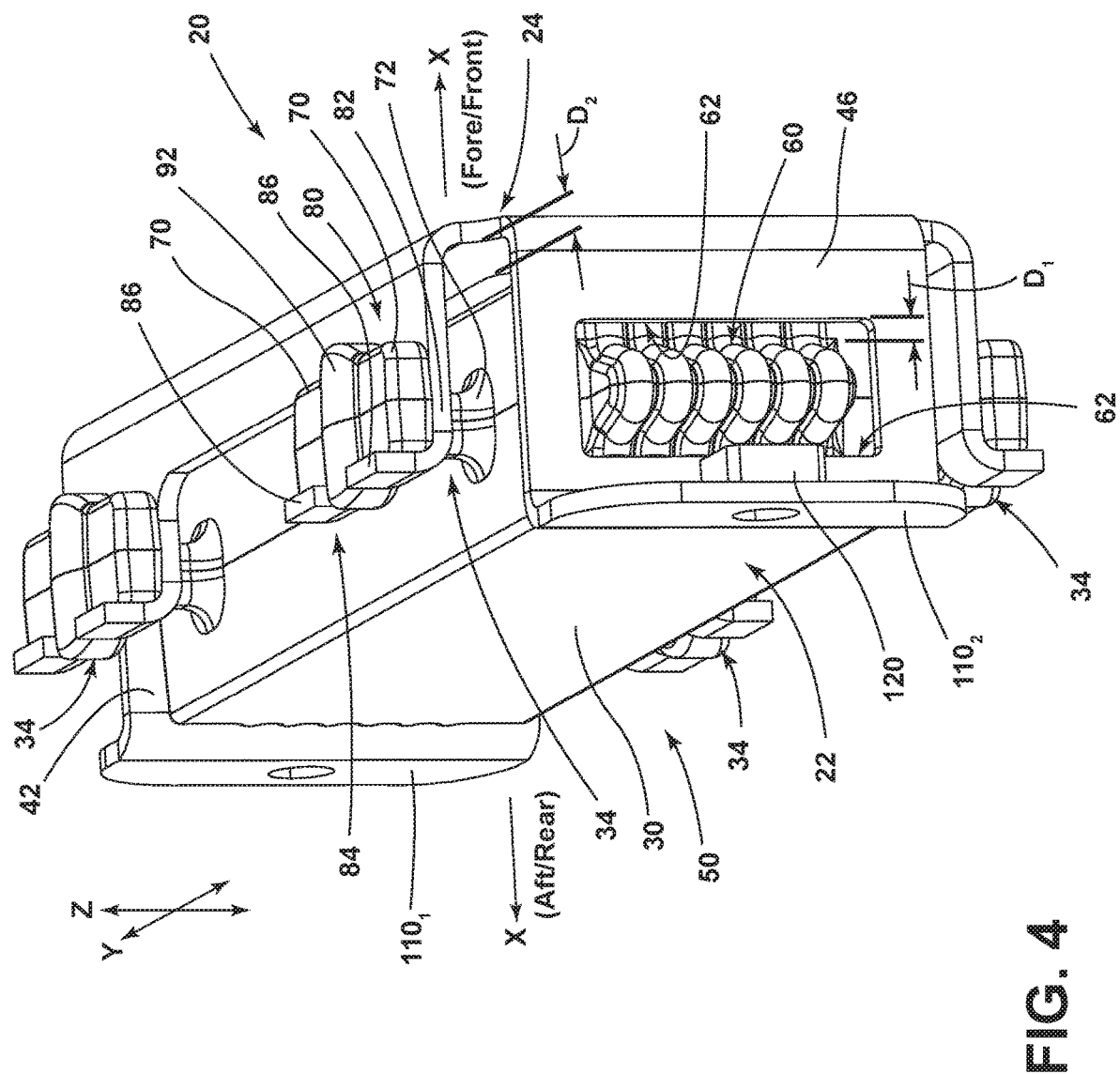
Figure 5:
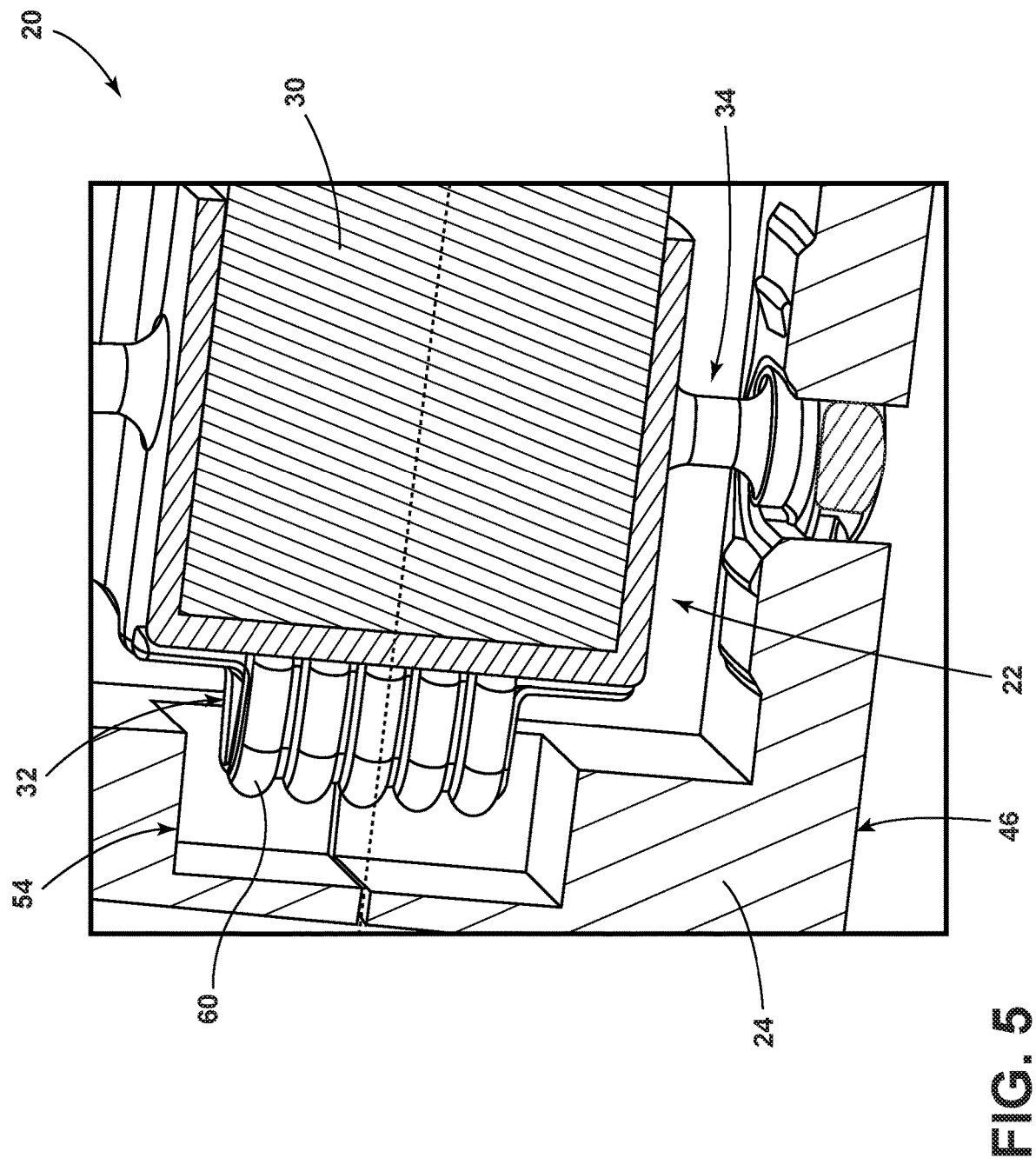
FIG. 5 is a cross-sectional view generally illustrating portions of embodiments of a damper and a bracket according to teachings of the present disclosure.
Figure 6A:
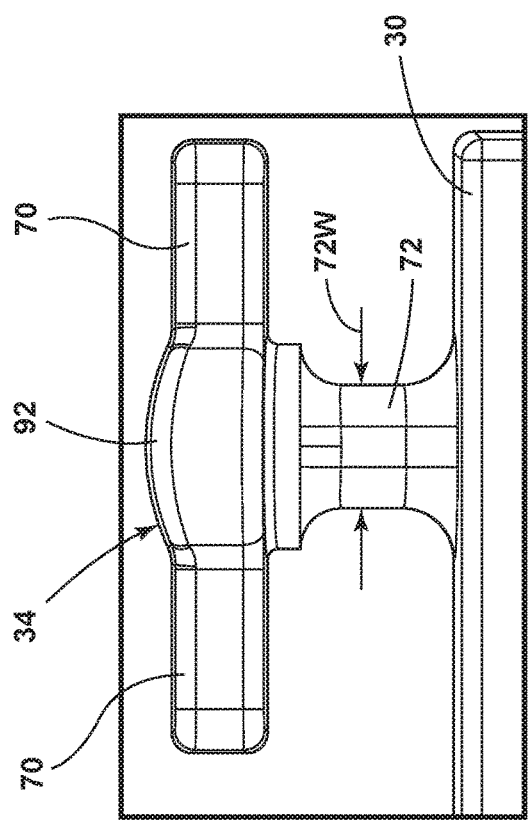
FIGS. 6A and 6B are side views generally illustrating portions of embodiments of connecting members according to teachings of the present disclosure.
Figure 6B:
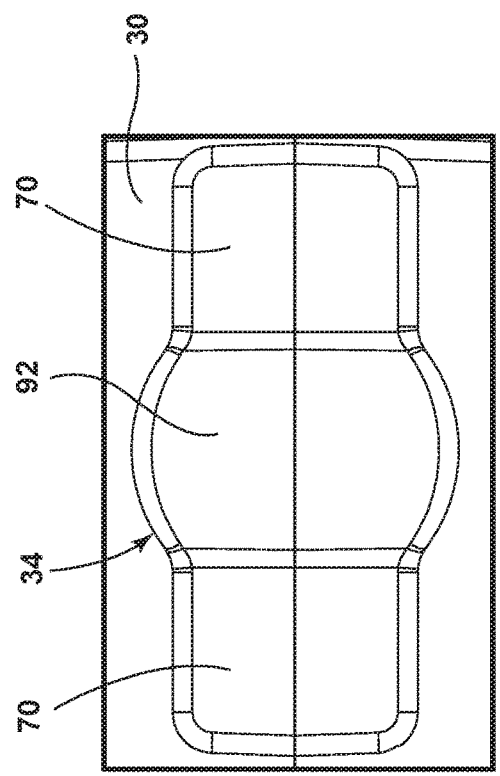

As generally illustrated in FIG. 4, in embodiments a distance D1 between a movement limiter 32 and the inner surface 62 of an aperture 52 or recess 54 of a bracket 24 may be less than a distance D2 between a body 30 of the damper 22 and the bracket 24 such that the movement limiter 32 contacts the inner surface 62 of the aperture 52 or recess 54 before the body 30 contacts the bracket 24.

In embodiments, a movement limiter with ribs 60 may reduce overall surface contact between the damper 22 and the bracket 24, such as compared to a movement limiter without ribs, including movement limiters with planar contact portions. For example and without limitation, reducing surface contact may, inter alia, reduce noise produced via contact between the damper 22 and the bracket, such as, for example, a slapping noise. With embodiments, a movement limiter 32 or a plurality of movement limiters 32 may be the only portions of a damper 22 that may contact a bracket 24. In embodiments, the size of the movement limiter 32 may remain substantially the same and the aperture 52 of the bracket 24 may be modified to set a working travel distance (e.g., distance D1) of the damper 22.

In embodiments, a damper 22 may include a pair of movement limiters 32 that may be disposed at opposite ends of the body 30 and may extend at least partially into corresponding apertures 52 or recesses 54 at opposite sides (e.g., the second side wall 42 and the fourth side wall 46) of the bracket 24.

With some embodiments, dampers may be directly molded to a body/mass and a bracket, and a bonding agent may be applied to the bracket. Such molding may involve larger cavities or molds to accommodate the mass and the bracket. Some embodiments may use "pull through carrot" style components instead of molding the mass to the bracket. Pull through carrot embodiments may involve a post assembly step of cutting excess material once assembled, which may add complexity to assembly.

In embodiments, such as generally illustrated in FIGS. 1, 4, 5, 6A, 6B, 7A, 7B, 8A, 8B, and 8C, one or more connecting members 34 may be configured to connect a body 30 with a bracket 24. As generally illustrated in FIGS. 6A-7A, a connecting member 34 may include one or more arms or wings 70 and/or a leg 72. A leg 72 may extend from the body 30 in a Z-direction (e.g., perpendicularly from the body 30) and/or may connect the one or more arms 70 with the body 30. The arms 70 may extend in opposite directions from each other and/or perpendicularly to the leg 72 (e.g., may extend in Y-directions). The arms 70 and the leg 72 may, for example, form a generally T-shaped or bow tie-shaped configuration. A damper 22 may include, for example only, four connecting members 34 that may include two connecting members 34 extending from a first side (e.g., a top) of the body 30 and two connecting members 34 extending from a second side (e.g., a bottom) of the body 30.

Figure 7A:
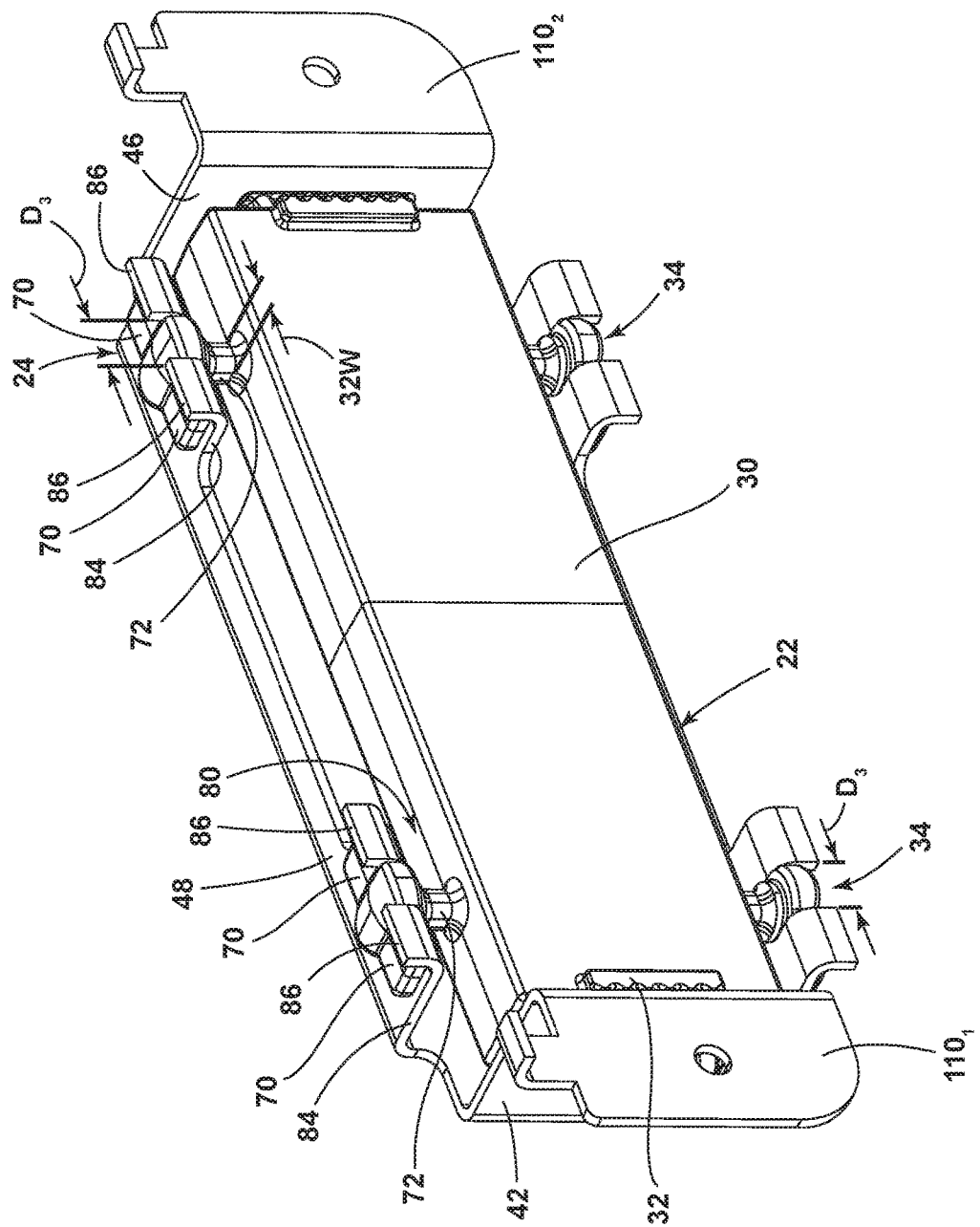
FIGS. 7A, 7B, and 7C are perspective views generally illustrating portions of embodiments of dampers and brackets according to teachings of the present disclosure.
Figure 7B:
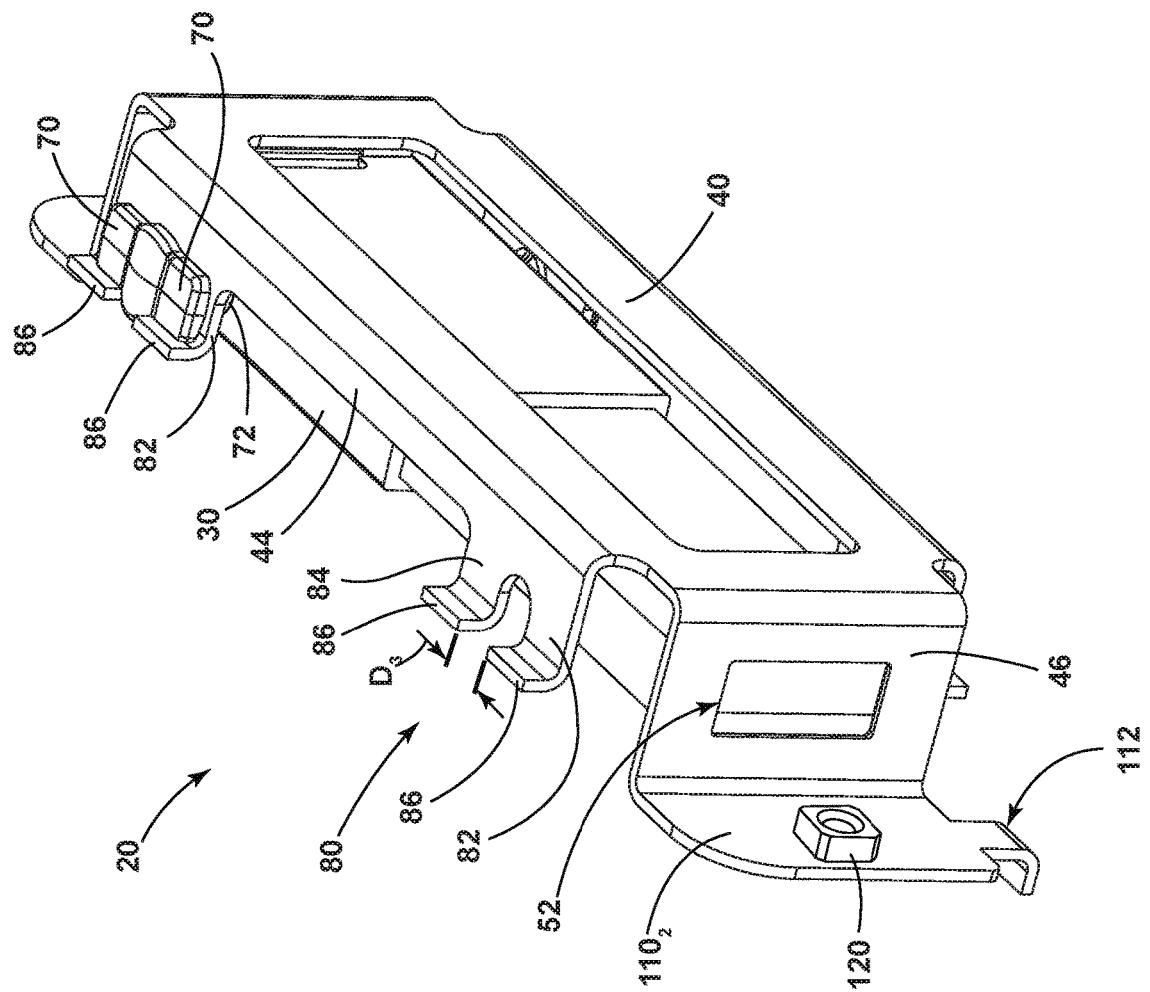
Figure 7C:
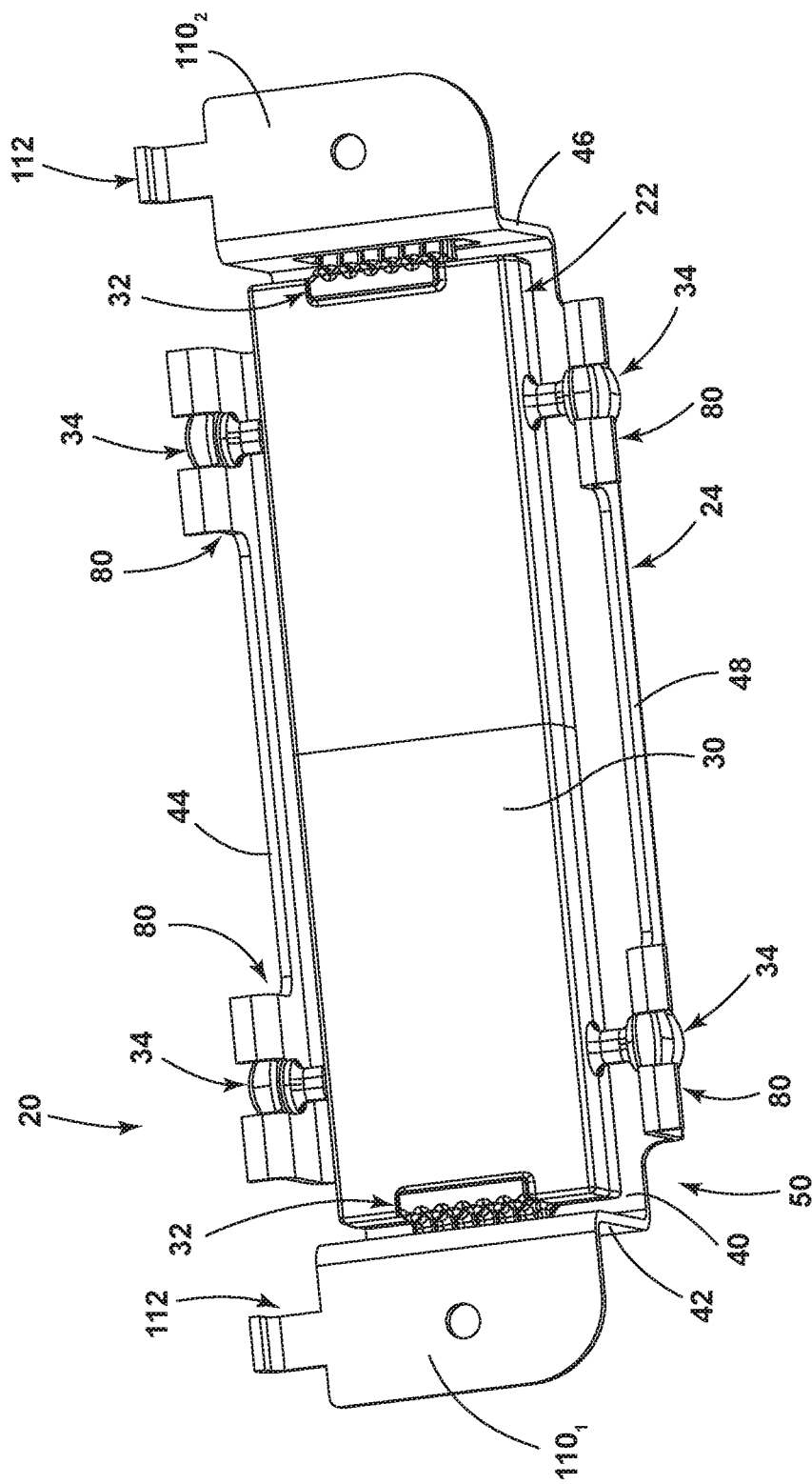

In embodiments, such as generally illustrated in FIGS. 7A-7C, a bracket 24 may include one or more retainers 80 that may correspond to the one or more connecting members 34. For example and without limitation, a retainer 80 may include forked configurations. Connecting a connecting member 34 with the bracket 24 may include snapping or pulling the arms 70 over a forked retainer 80 such that a leg 72 is disposed at least partially in the forked retainer 80. Snapping or pulling the arms 70 over the forked retainer 80 may include at least some deformation and/or stretching of the leg 72, such as in an axial direction of the leg 72, which may be a Z-direction. Deformation and/or stretching of the leg 72 may be only temporary during a connection process, and once connection is complete, the leg 72 may return to an initial state and/or may not be materially deformed, stretched, and/or stressed in a rest state (e.g., in an assembled configuration). For example and without limitation, in an assembled configuration, a connecting member 34 may not under a material amount of tensile strain to impart major deformation and/or fatigue (e.g., a leg 72 may be stretched about 5% or less, which may not cause substantial/material fatigue). A connection process may include snapping one or more movement limiters 32 into corresponding apertures 52, which may include at least some deformation of the movement limiters 32. Connecting a damper 22 with a bracket 24 via the connecting members 34 may not involve any post assembly operations as the connecting members 34 may not include any excess portions to be removed.

In embodiments, a retainer 80 may include a first portion 82 and a second portion 84 that may be spaced from the first portion 82. The first portion 82 and the second portion 84 may be disposed in a fork-like configuration. A distance D3 between the first portion 82 and the second portion 84 may correspond to a width 72W of a leg 72 of a corresponding connecting member 34 (see, e.g., FIG. 7A). A retainer 80 may include one or more lip or flange portions 86 that may extend from a first portion 82 and/or from a second portion 84. The lip or flange portions 86 may extend away from the body 30, such as in a Z-direction and/or in a direction parallel to an axial direction of the leg 72 of a corresponding connecting member 34, which may be parallel to a Z-direction. Connecting a damper 22 with a bracket 24 may include lifting/pulling arms of a connecting member 34 outward beyond a lip or flange portion 86, sliding a leg 72 of the connecting member 34 between the first portion 82 and the second portion 84, and/or releasing the arms 70 to rest on the first portion 82 and the second portion 84.

With some embodiments, dampers may be attached to upper and lower sections of a C-channel or cross member. A damper may be connected to a C-channel or cross member via upper and lower brackets, such as to accommodate or compensate for differences in attachment distances (e.g., if an attachment distance is on the low or high side of dimensional specifications). Some dampers may be directly bonded to an upper and lower bracket. If the attachment distance is not within a specified range, rubber legs of the damper may either be stretched or compressed while the damper is attached (and at rest) and/or during use. Such stretching or compression may cause durability issues or premature wear for the damper.

With embodiments, such as generally illustrated in FIG. 7C, a mounting portion, such as mounting portions $110_1$, $110_2$ may include tabs 112 that may have an L-shaped configuration. Tabs 112 may extend from a side of mounting portions $110_1$, $110_2$ and/or may be configured to facilitate connection of a bracket 23 with a mounting component 36.

Figure 8C:
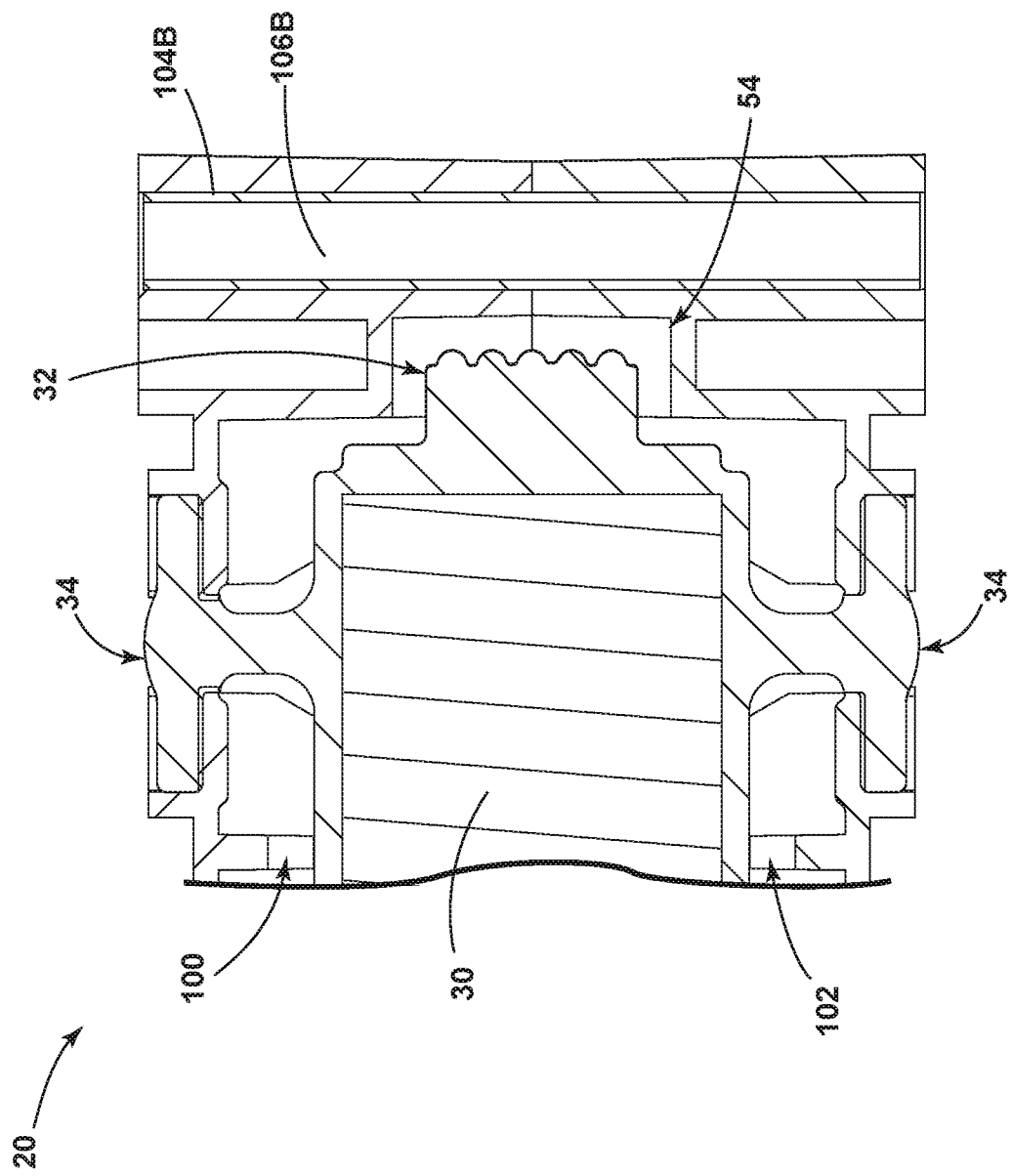
FIG. 8C is a cross-sectional view generally illustrating portions of an embodiment of a damper and a bracket according to teachings of the present disclosure.
Figure 10:
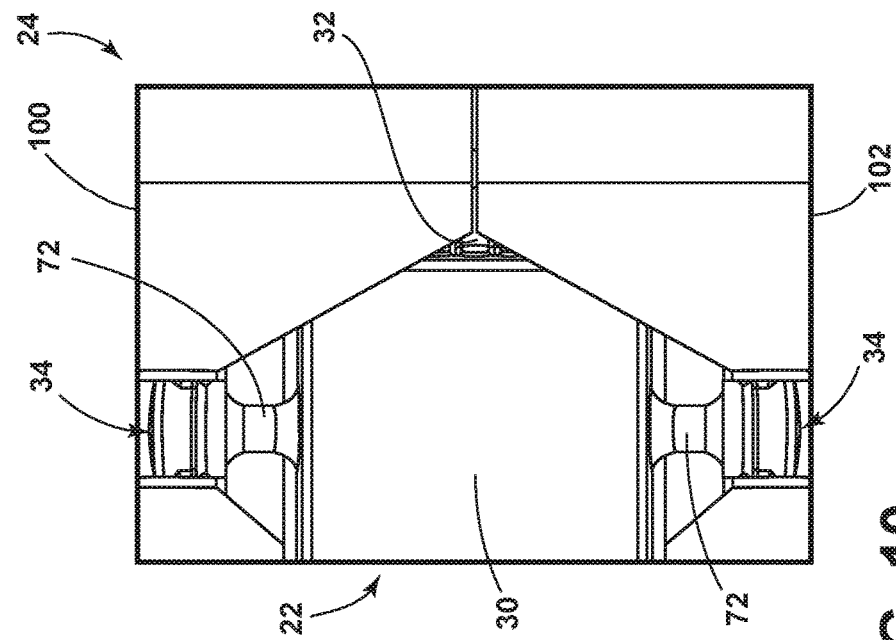
FIG. 10 is a side view generally illustrating portions embodiments of a damper and a bracket according to teachings of the present disclosure.

With embodiments, such as generally illustrated in FIGS. 8A, 8B, and 8C, a damper assembly 20 may include a bracket 24 that may include a first portion 100 and a second portion 102 (e.g., first and second halves). A damper assembly 220 may include one or more connectors 106A, 106B that may connect the first portion 100 with the second portion 102. A connector 106A, 106B may include one or more of a variety of shapes, sizes, and/or configurations. For example and without limitation, a connector 106A, 106B may include a tube-shaped and/or shaft-shaped configuration, among other configurations. A bracket 24 may include recesses 104A, 104B that may be configured to at least partially receive connectors 106A, 106B, respectively. The first portion 100 and second portion 102 of the bracket 24 may cooperate to form recesses 104A, 104B, respectively (e.g., first portion 100 and second portion 102 may each include about half of recesses 104A, 104B).

Figure 9A:
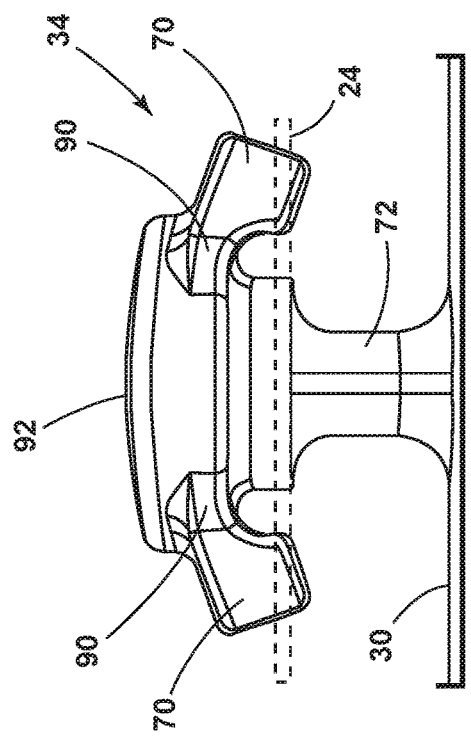
FIGS. 9A and 9B are side views generally illustrating portions of embodiments of connecting members according to teachings of the present disclosure.
Figure 9B:
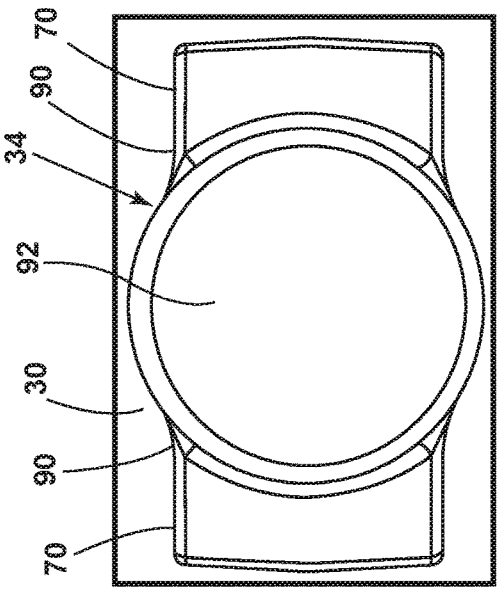
Figure 11:
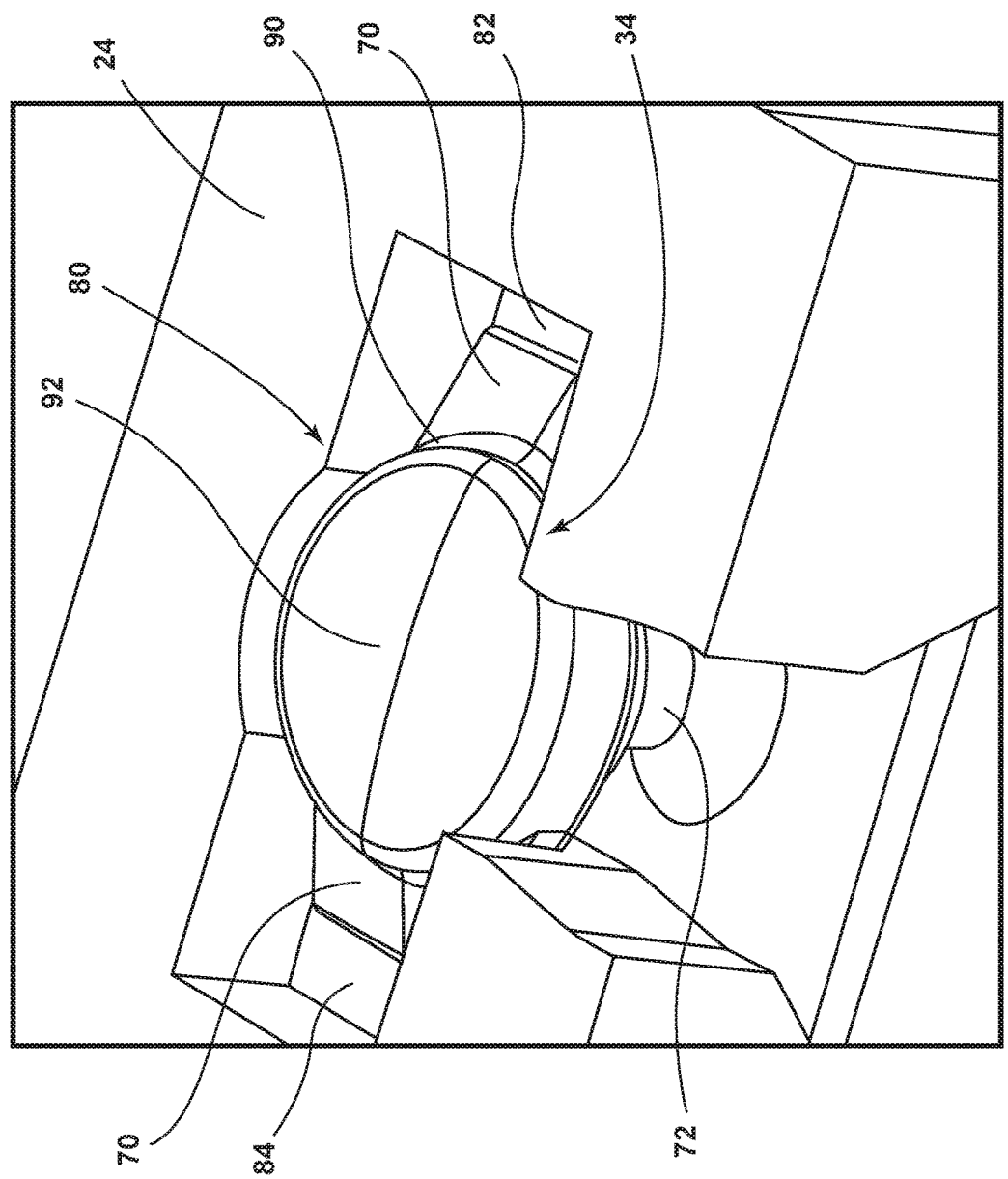
FIG. 11 is a perspective view generally illustrating portions of embodiments of a damper and a bracket according to teachings of the present disclosure.

In embodiments, such as generally illustrated in FIGS. 9A, 9B, and 11, a connecting member 34 may be configured to transfer stress of a leg 72 of the connecting member 34 to a different area or location, such as to the arms 70. For example and without limitation, an arm 70 may include a stress relief or transfer portion 90. A stress relief or transfer portion 90 may correspond to a portion of the arm 70 with a reduced thickness that may be configured for deflection under stress. Stress relieved or transferred via a stress relief or transfer portion 90 may otherwise be experienced by a leg 72 (e.g., arms 70 or stress relief portions 90 may be designed to flex or deform before the leg 72 flexes or deforms).

With embodiments, relocating or transferring stresses to a non-functioning feature (e.g., the arms) may improve durability and overall life of the damper 22. The arms of the connecting members 34 may be angled (e.g., toward the body 30) and/or may act as a preload if the legs 72 are in compression, which may improve durability of the legs 72. A damper 22 with stress relieving connecting members 34 may provide improved, such as, for example, if an attachment distance is outside of a nominal range on a high end or a low end (e.g., ±5 mm).

With embodiments, a connecting member 34 may include a substantially round or cylindrical portion 92. The arms of a connecting member 34 may extend from the round or cylindrical portion 92. The round or cylindrical portion 92 may be connected to the leg 72.

In embodiments, such as generally illustrated in FIGS. 2A, 2B, 5, 10, and 11, a bracket 24 may include a first portion 100 and a second portion 102. The first portion 100 and the second portion 102 may be configured to move (e.g., translate or slide) relative to each other, such as if an attachment distance is greater than or less than a nominal/design distance.

With embodiments, such as generally illustrated in FIGS. 1, 1A, 3, 4, 7A, 7B, and 7C, a bracket 24 may include one or more mounting portions 110. A mounting portion 110 may be configured for connecting a damper assembly 20 and/or a bracket 24 with a mounting component 36, such as a portion of a vehicle (e.g., a vehicle seat structure). A mounting portion 110 may, for example and without limitation, include a threaded portion 120, such as nut welded to the mounting portion 110. A mounting portion 110 may extend from a side wall of a bracket, such as from a second side wall 42 and/or from a fourth side wall 46. A mounting portion (e.g., mounting portion $110_1$, $110_2$) may extend from an end of a side wall, such as generally illustrated in FIGS. 1, 1A, 3, 4, 7A, 7B, and 7C. For example and without limitation, a mounting portion $110_1$ may extend from an end of a second side wall 42 and/or a mounting portion $110_2$ may extend from an end of a fourth side wall 46, such as for a rear-side mounting configuration.

Figure 12A:
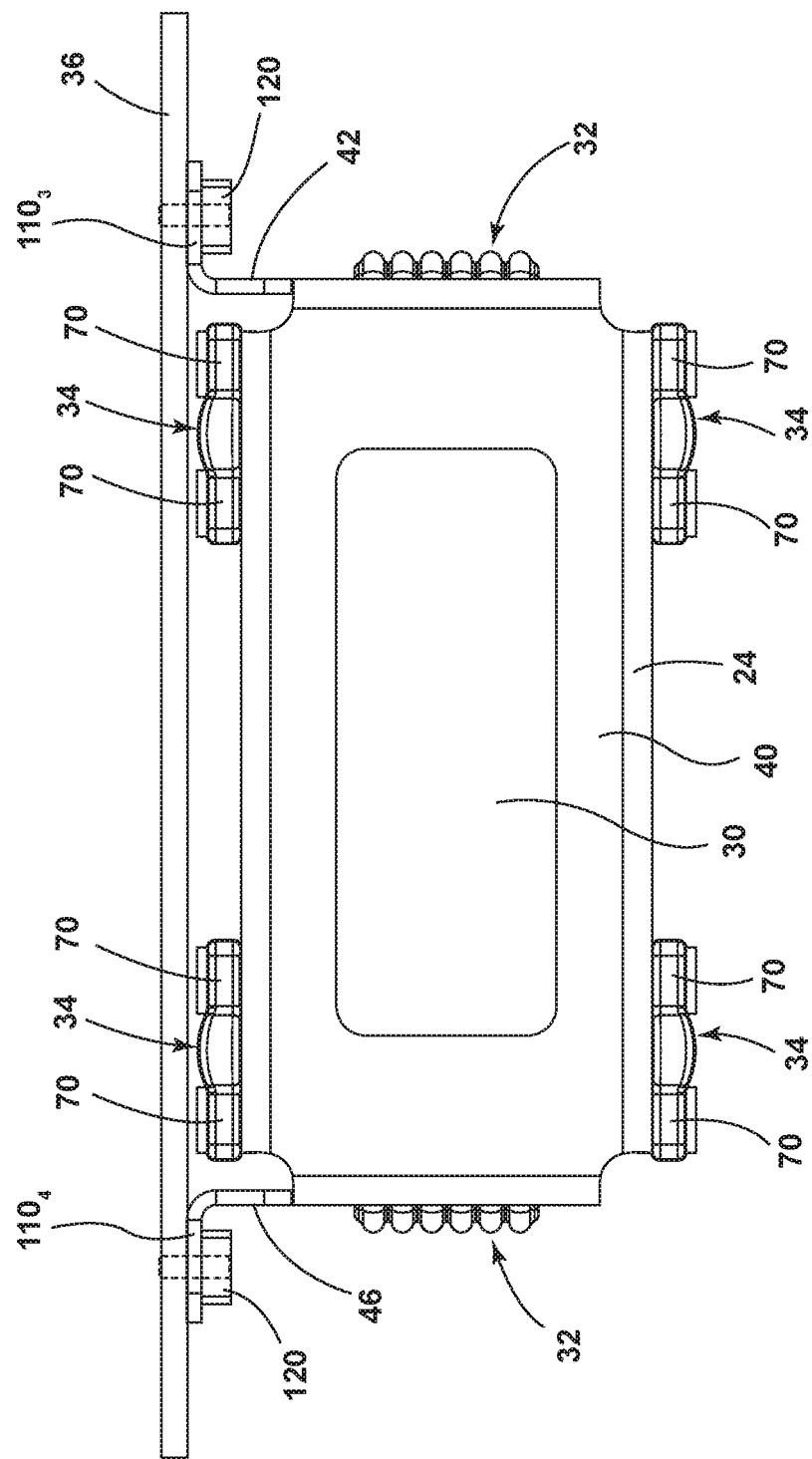
FIGS. 12A and 12B are a side view and a perspective view generally illustrating portions of embodiments of dampers and brackets according to teachings of the present disclosure.
Figure 12B:
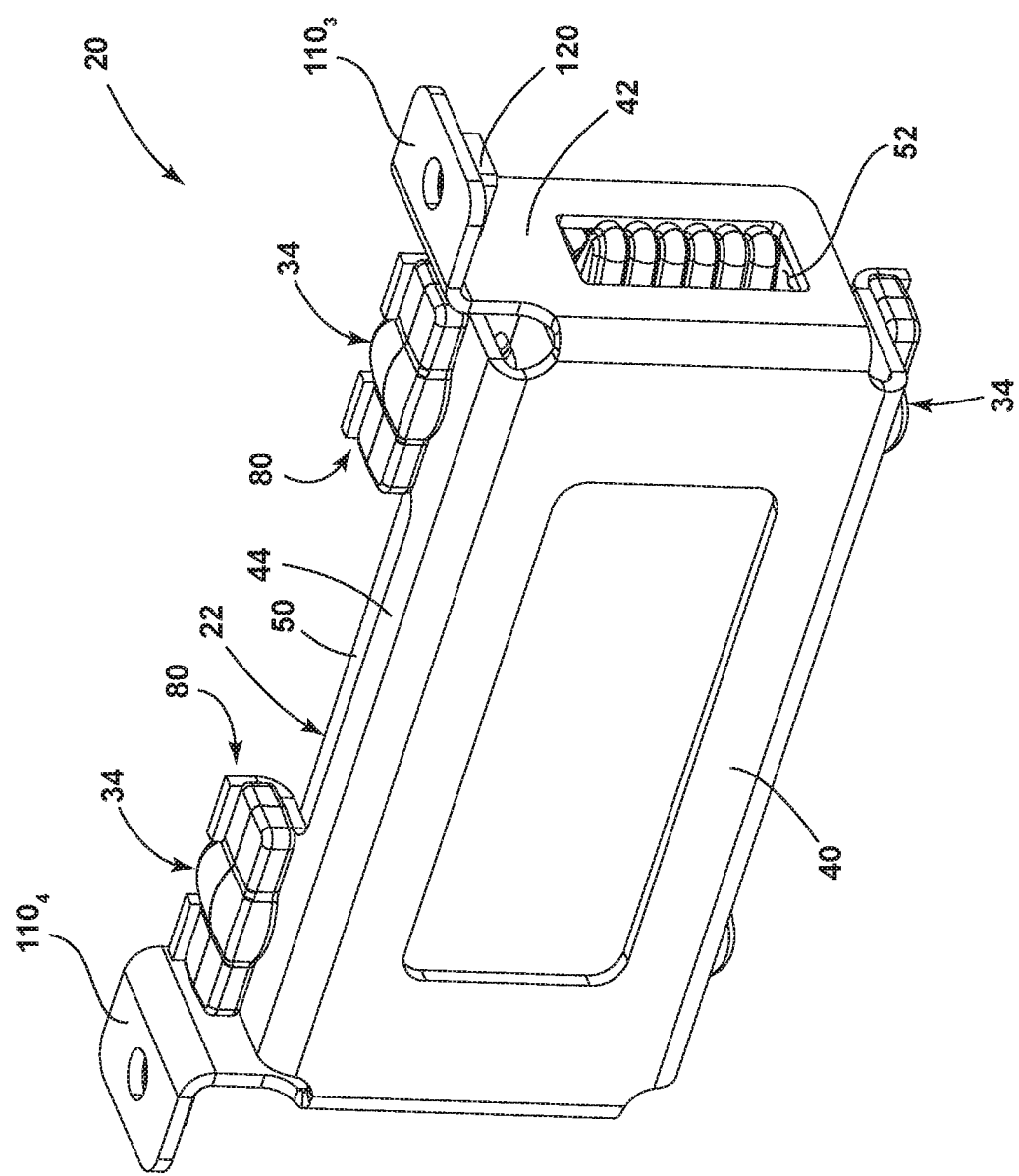

With embodiments, such as generally illustrated in FIGS. 12A and 12B, a mounting portion (e.g. mounting portion $110_3$) may extend from a side of a second side wall 42 and/or a mounting portion (e.g. mounting portion $110_4$) may extend from side of a fourth side wall 46, such as for an overhead mounting configuration. Mounting portions $110_3$, $110_4$ may be disposed substantially parallel with the third side wall 44 and/or the fifth side wall 48.

Figure 13A:
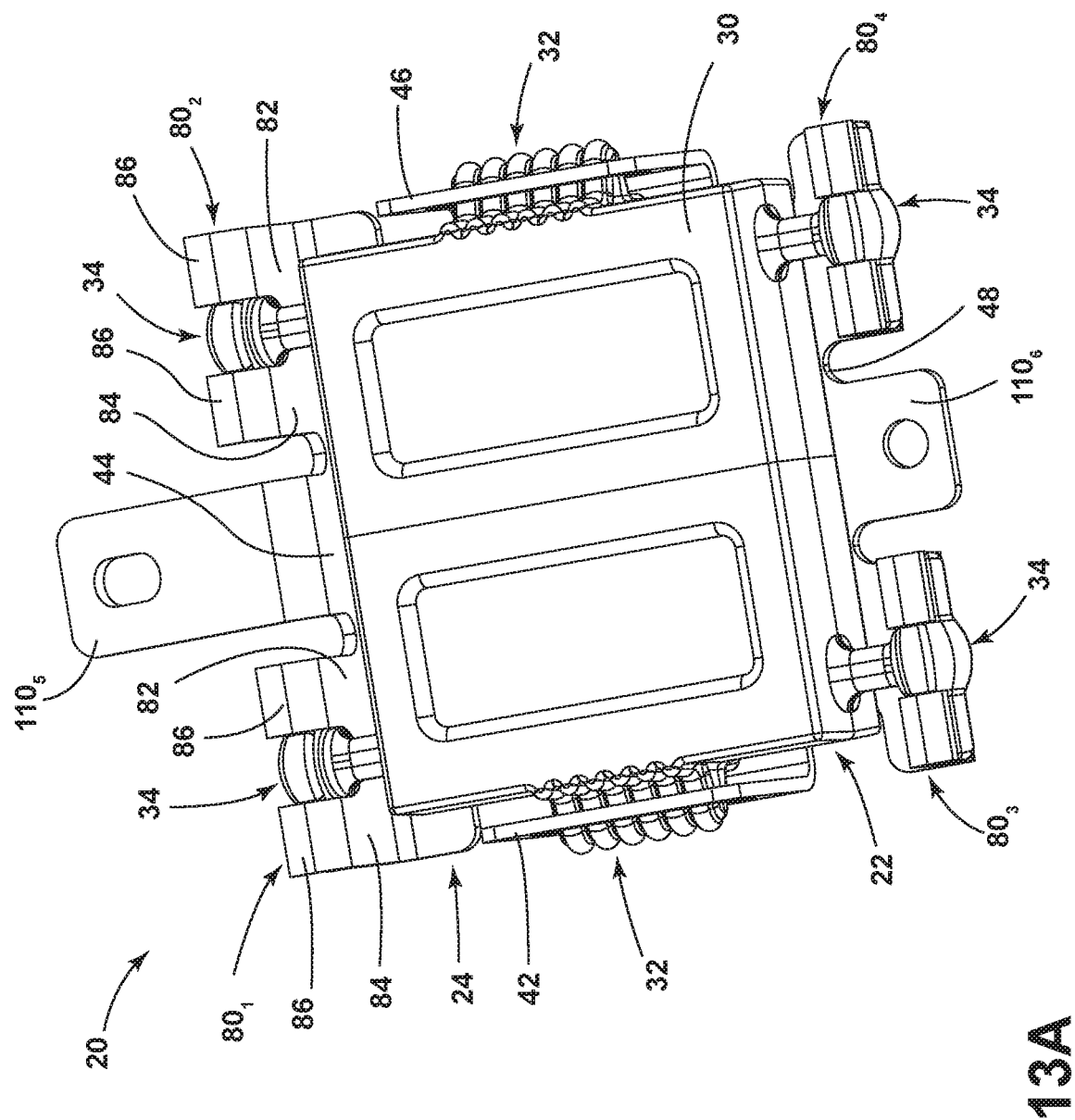
FIGS. 13A and 13B are perspective views generally illustrating portions of embodiments of dampers and brackets according to teachings of the present disclosure.
Figure 13B:
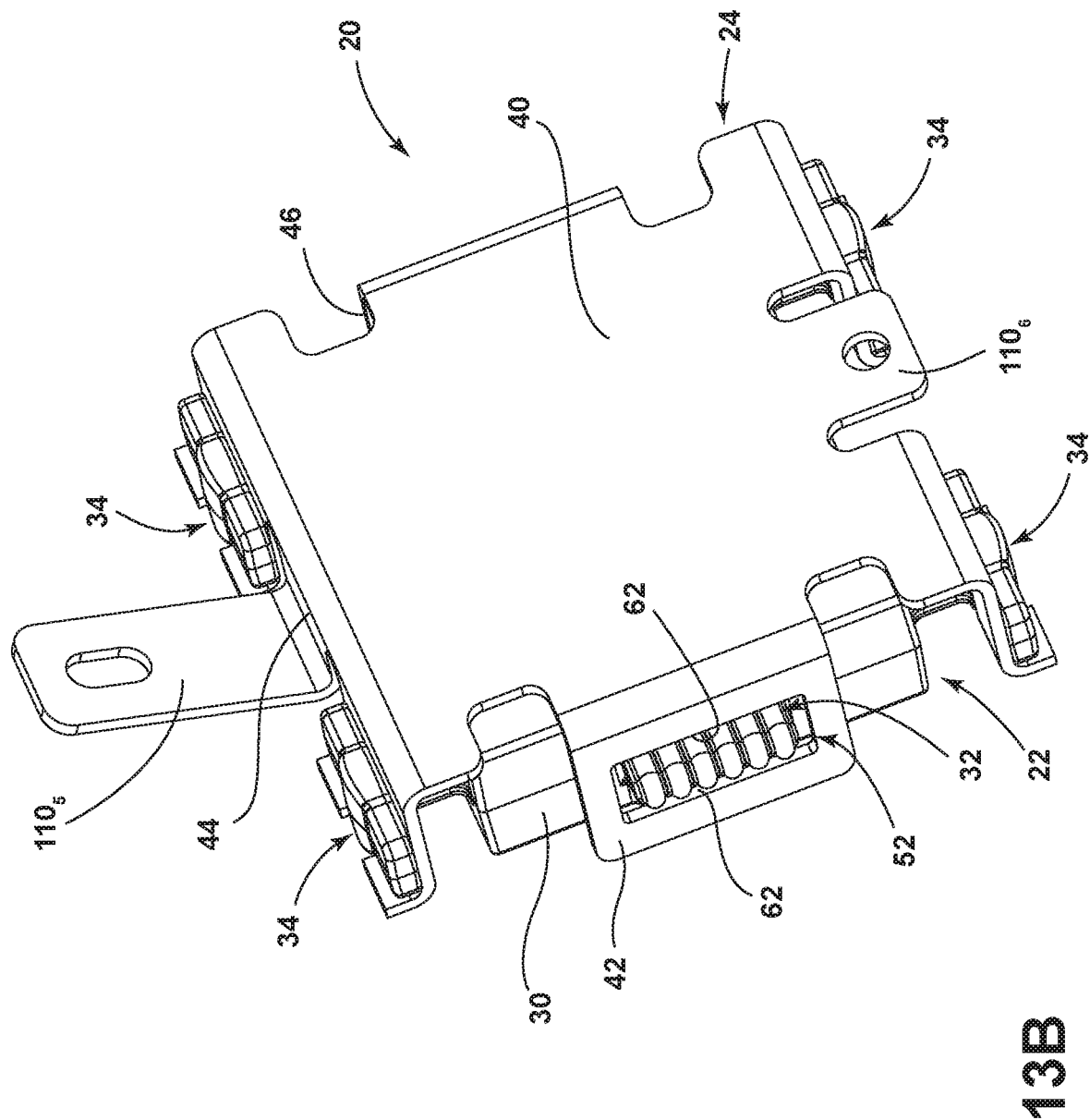
Figure 14A:
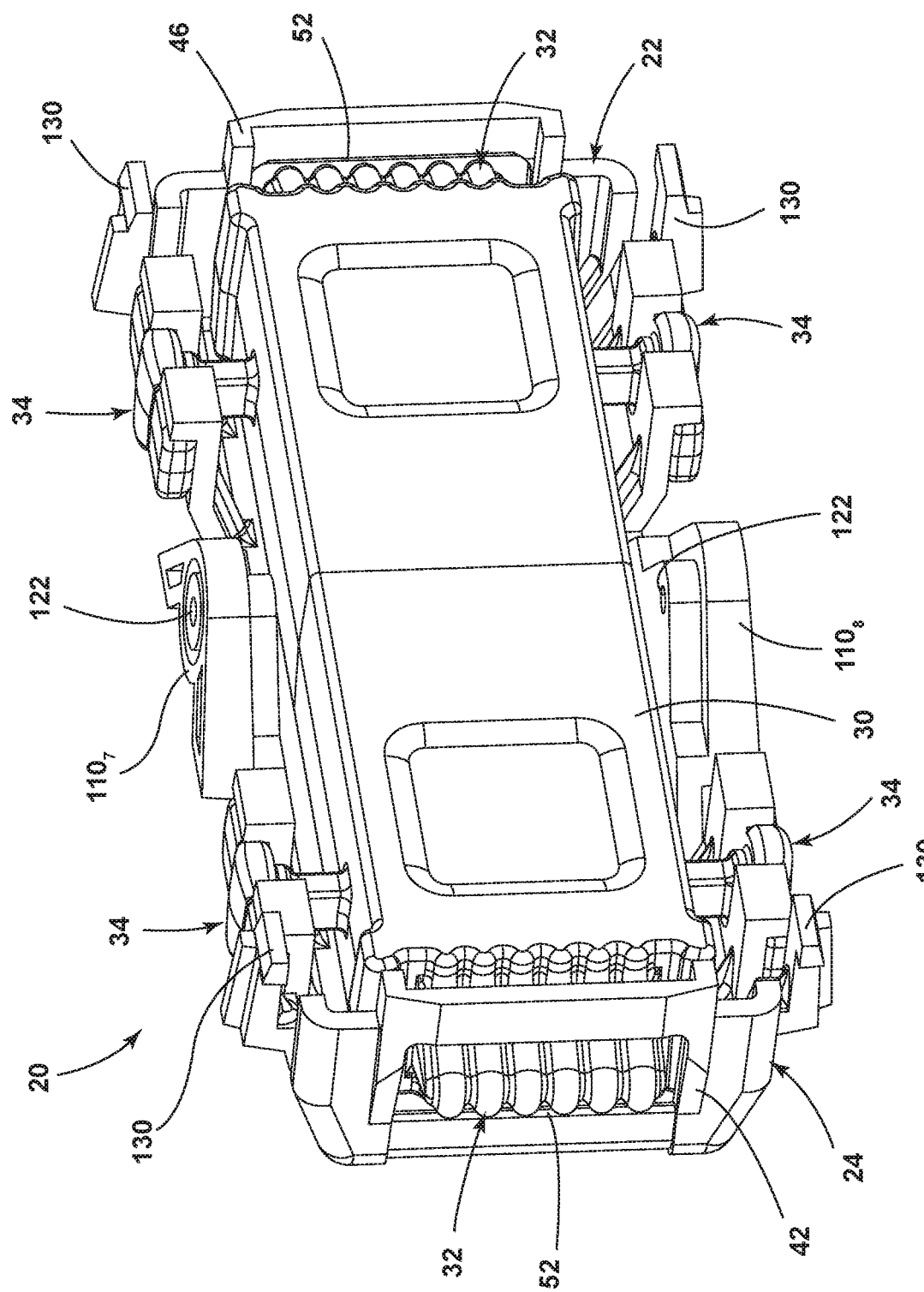
FIGS. 14A and 14B are perspective views generally illustrating portions of embodiments of dampers and brackets according to teachings of the present disclosure.
Figure 14B:
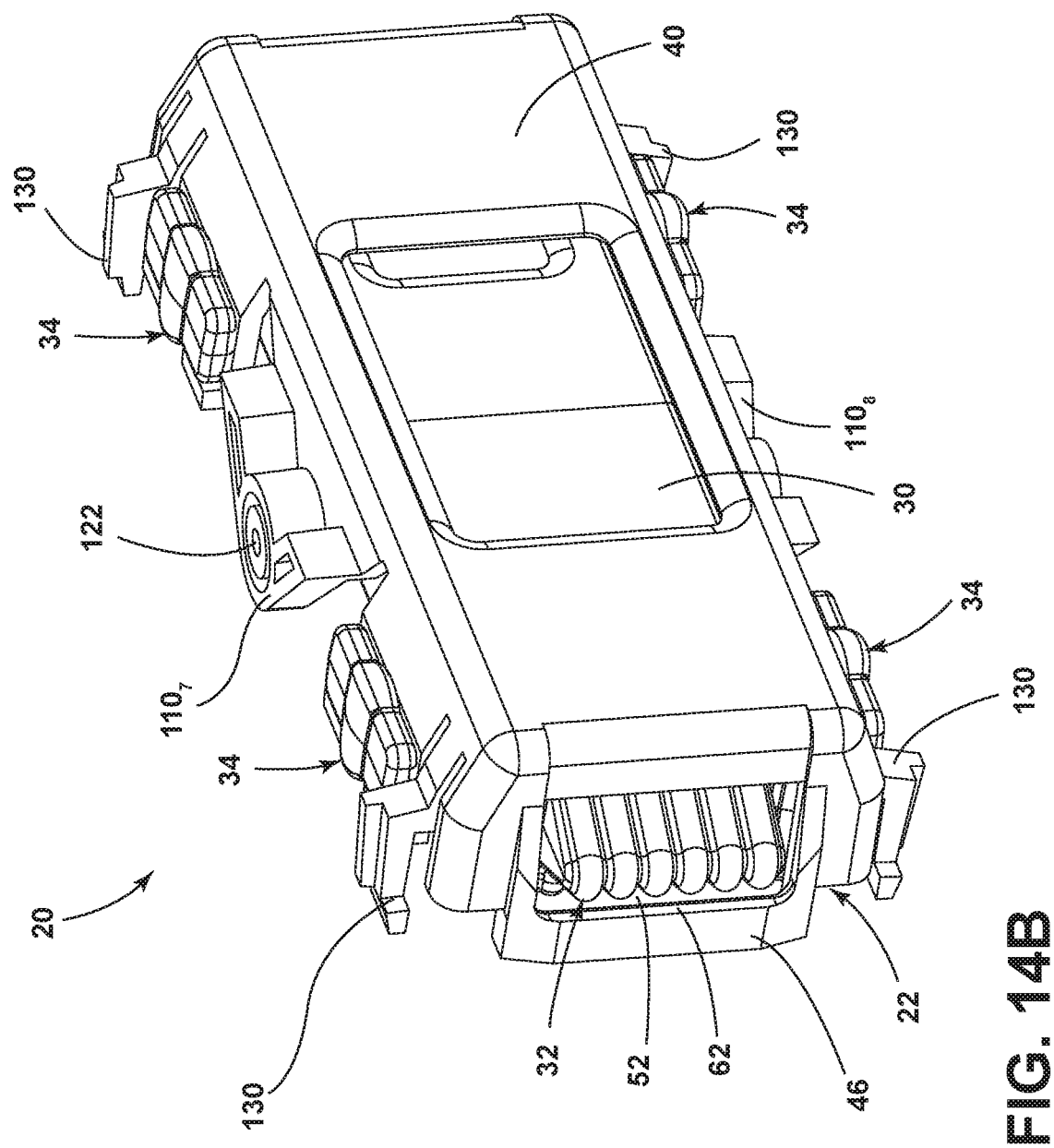
Figure 14C:
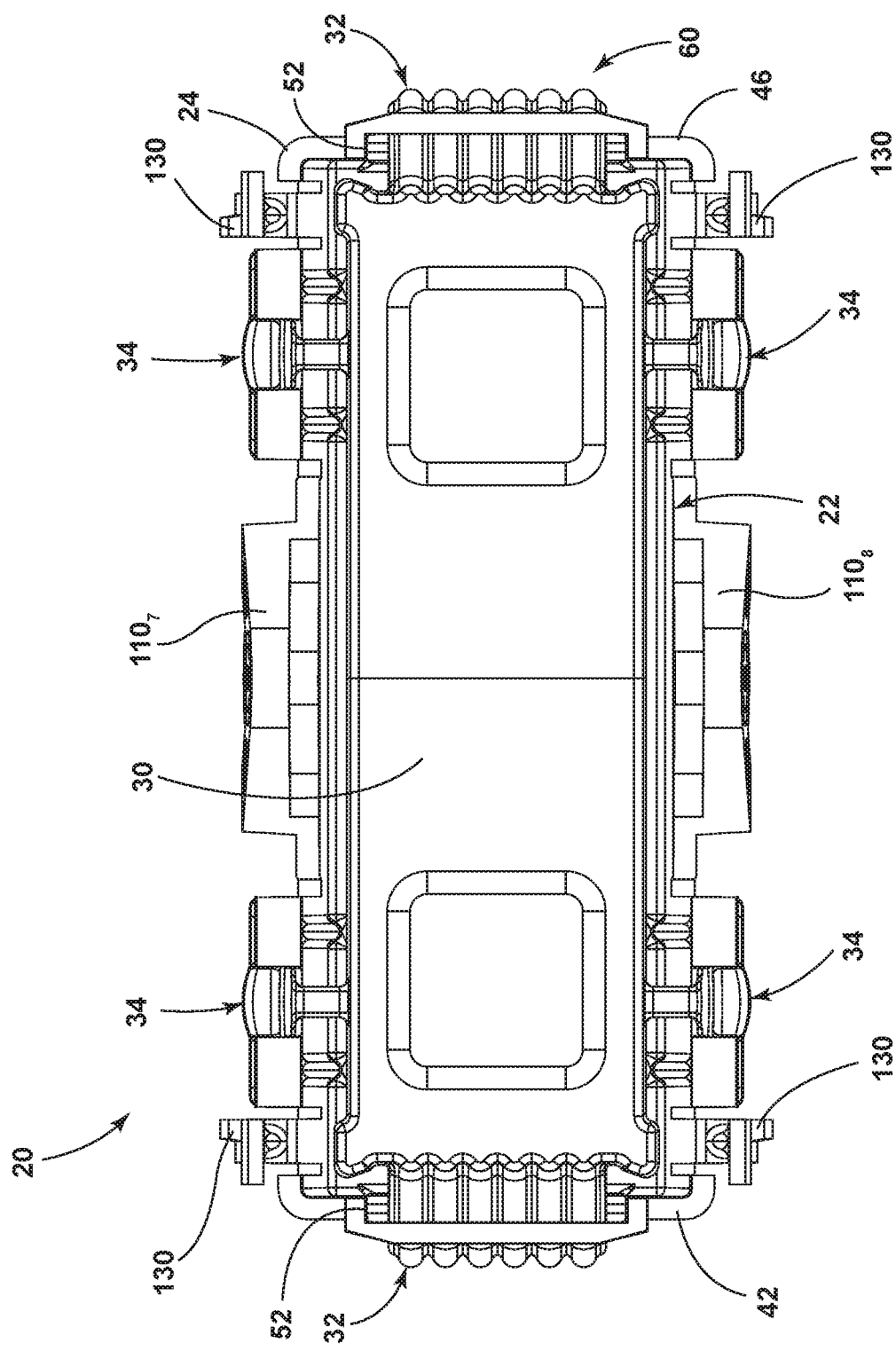
FIGS. 14C and 14D are a side view and a top view generally illustrating portions of embodiments of dampers and brackets according to teachings of the present disclosure.
Figure 14D:
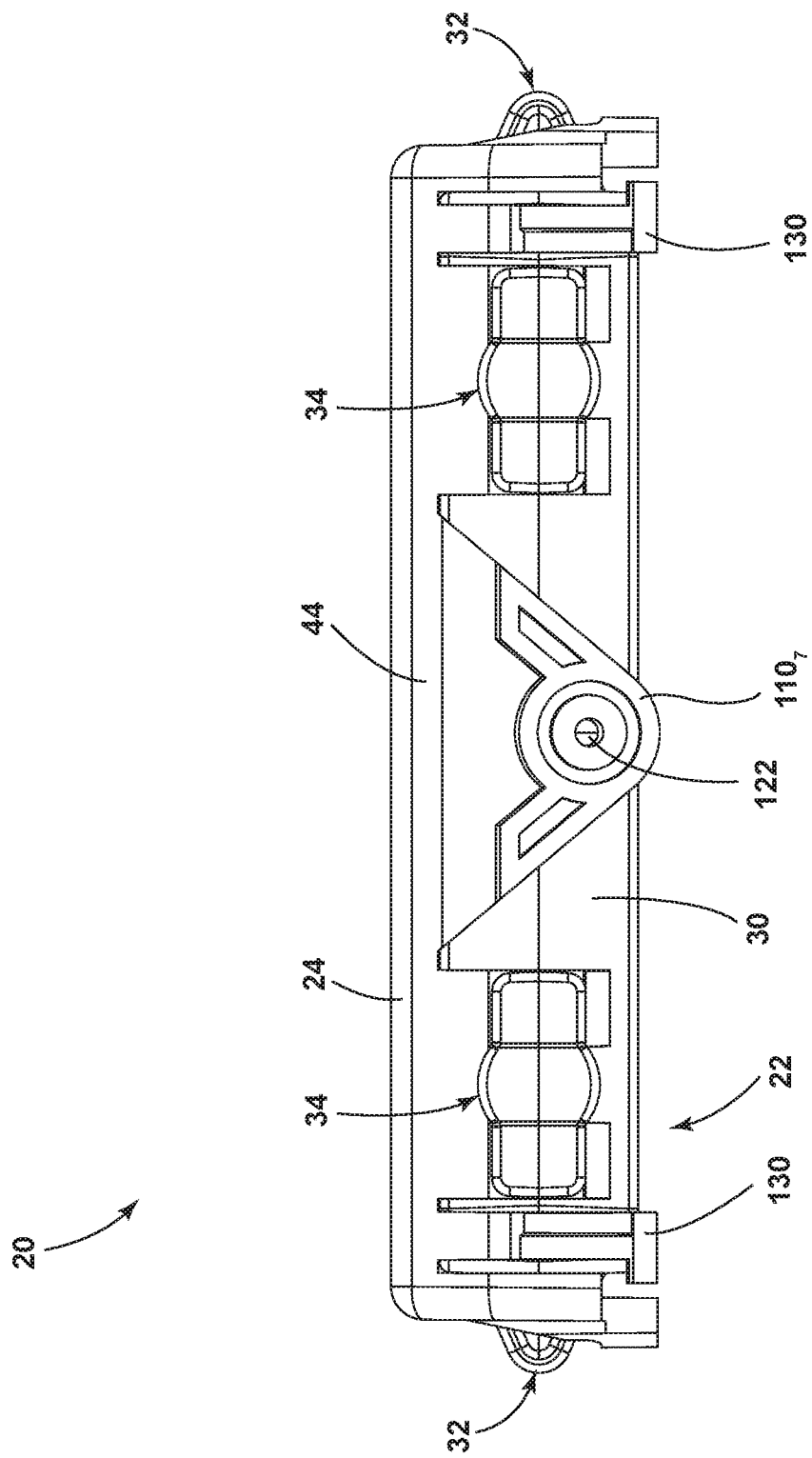

In embodiments, such as generally illustrated in FIGS. 13A and 13B, a mounting portion $110_5$ may extend from a third side wall 44 and/or a mounting portion $110_6$ may extend from a first side wall 40. A mounting portion $110_5$ may be disposed between (e.g., relative to a Y-direction) a first retainer $80_1$/a first connecting member 34 and a second retainer $80_2$/a second connecting member 34. A first retainer $80_1$ and a second retainer $80_2$ may extend from a common side of the bracket 24. A pair of connecting members 34 (e.g., first and second connecting members) may extend from a common side of the damper 22. Additionally or alternatively, a mounting portion $110_6$ may be disposed between a third retainer $80_3$ and a fourth retainer $80_4$. A mounting portion $110_5$ may extend at an angle (e.g., an oblique or right angle) relative to third side wall 44. A mounting portion 110 may extend substantially parallel with first side wall 40. Mounting portions 110 may, for example and without limitation, include generally rectangular configurations.

With embodiments, such as generally illustrated in FIGS. 14A, 14B, 14C, and 14D, a mounting portion $110_7$ may extend from a third side wall 44 and/or a mounting portion $110_8$ may extend from a fifth side wall 48. Mounting portions $110_7$, $110_8$ may, for example and without limitation, include generally triangular and/or V-shaped configurations that may taper away from the first side wall 40 of the bracket 24. A mounting portion $110_7$, $110_8$ may extend substantially parallel with the third side wall 44 and/or a mounting portion $110_7$, $110_8$ may extend substantially parallel with the fifth side wall 48. Mounting portions $110_7$, $110_8$ may include apertures 122 that may be configured to receive a fastener for connecting the bracket 24 with an mounting component 36.

In embodiments, such as generally illustrated in FIGS. 14A, 14B, 14C, and 14D a bracket 24 may include one or more clips 130 (e.g., flexible mounting clips). A clip 130 may be configured to engage a mounting component 36 to at least temporarily retain a bracket 24 relative to the mounting component 36 and/or to facilitate alignment of mounting portions 110 with the mounting component 36. A clip 130 may be flexible/resilient and/or may be configured to bend or flex into and/or out of engagement with a mounting component 36. For example and without limitation, during a connection with a mounting component 36, the one or more clips 130 may initially flex (e.g., in a Y-direction and/or in a Z-direction) and/or may snap back and into engagement with the mounting component 36.

Figure 15A:
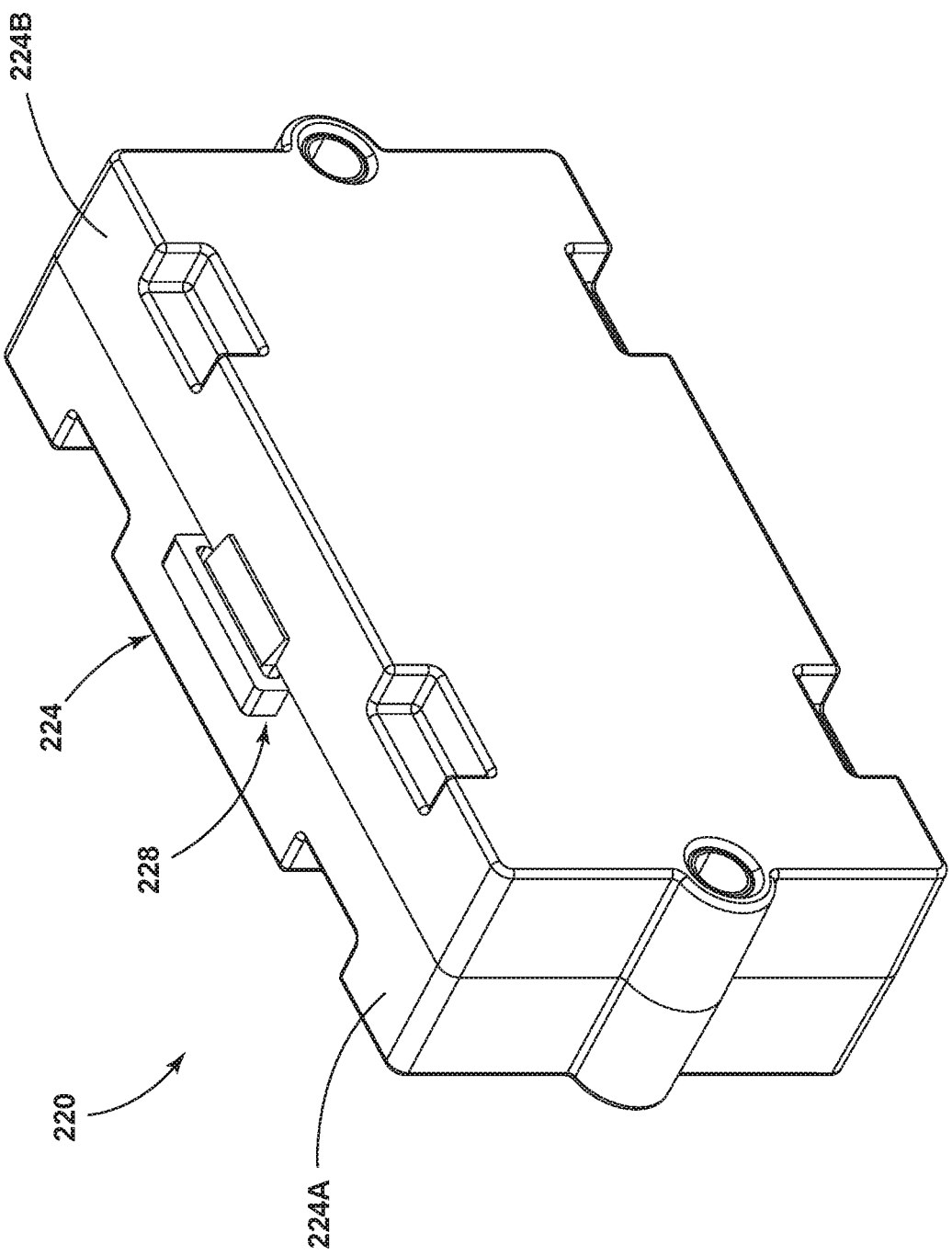
Figure 15B:
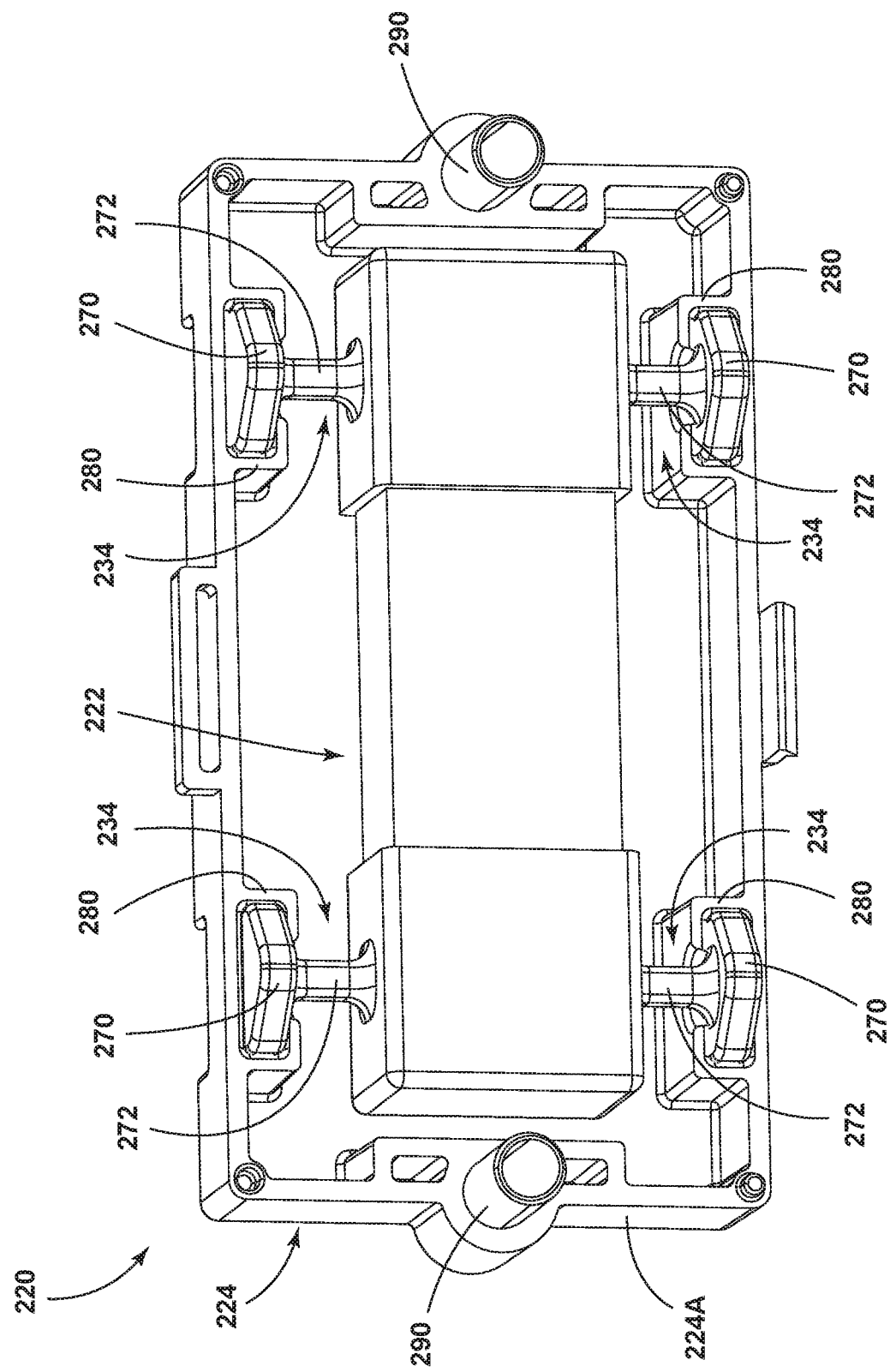

With embodiments, such as generally illustrated in FIGS. 15A, 15B, and 15C, a damper assembly 220 may include a damper 222 and a bracket 224. A damper 222 may include one or more connecting members 234 that may connect the damper 222 with the bracket 224. A connecting member 234 may include a head 270 and/or a leg 272 that may connect the head 270 with a body 230 of the damper 222. A head 270 may include one or more of a variety of shapes, sizes, and/or configurations. For example and without limitation, a head 270 may include a rectangular, square, and/or diamond-shaped configurations, among other configurations. With embodiments, a head 270 may be disposed substantially perpendicular to a leg 272.

Figure 16A:
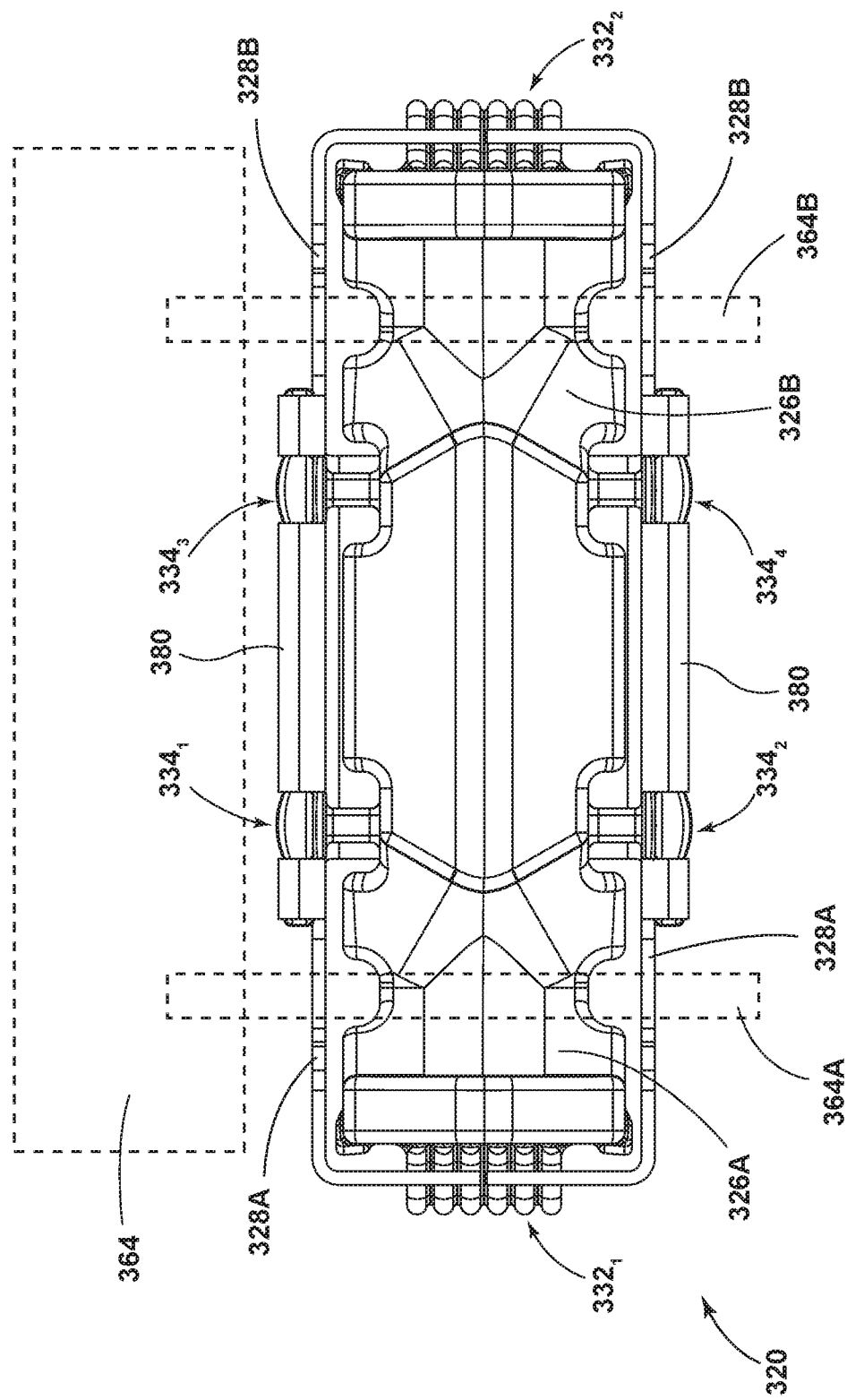
FIGS. 16A, 16B, and 16C are perspective views generally illustrating portions of damper assemblies according to teachings of the present disclosure.
Figure 16B:
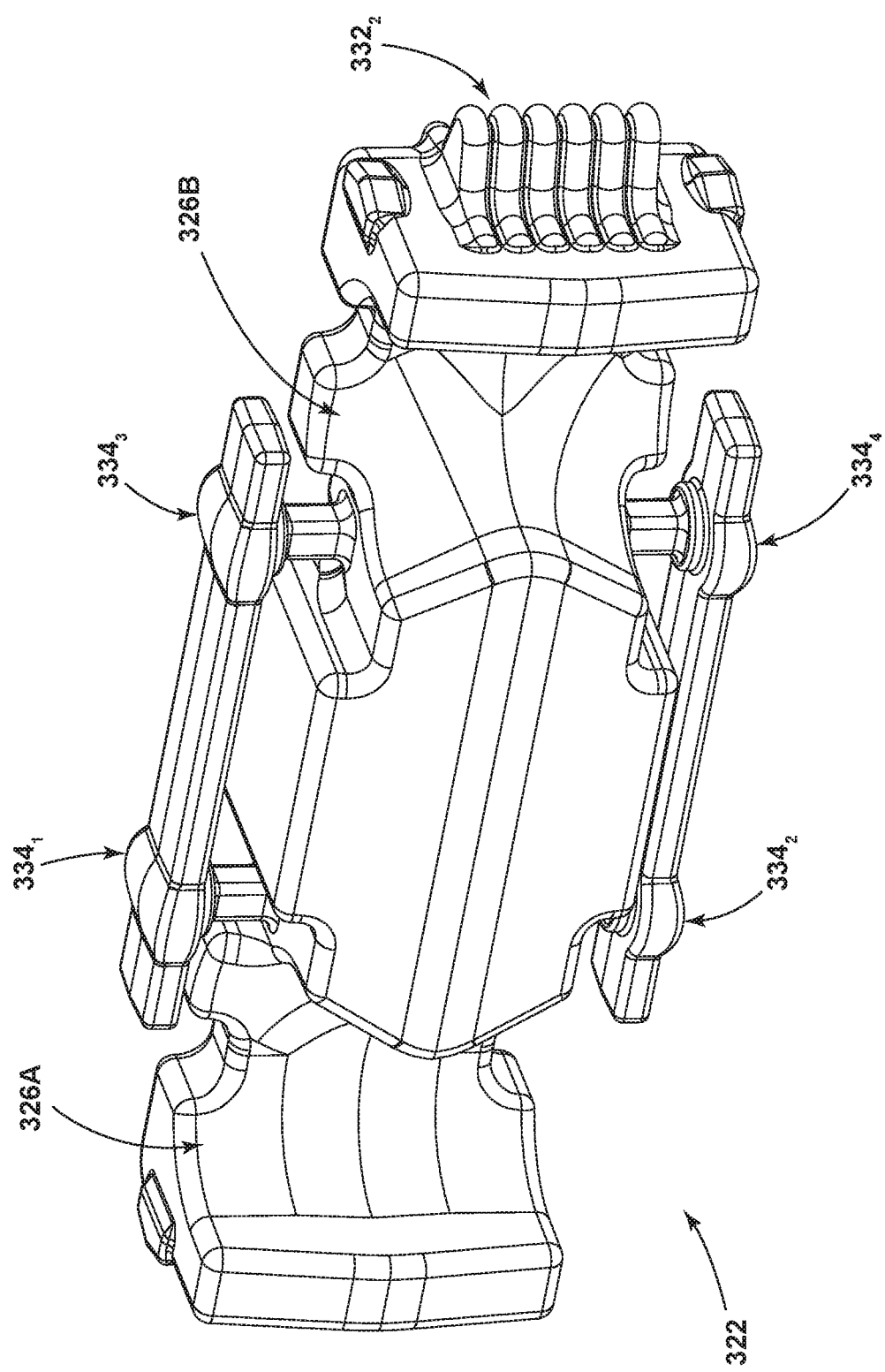
Figure 16C:
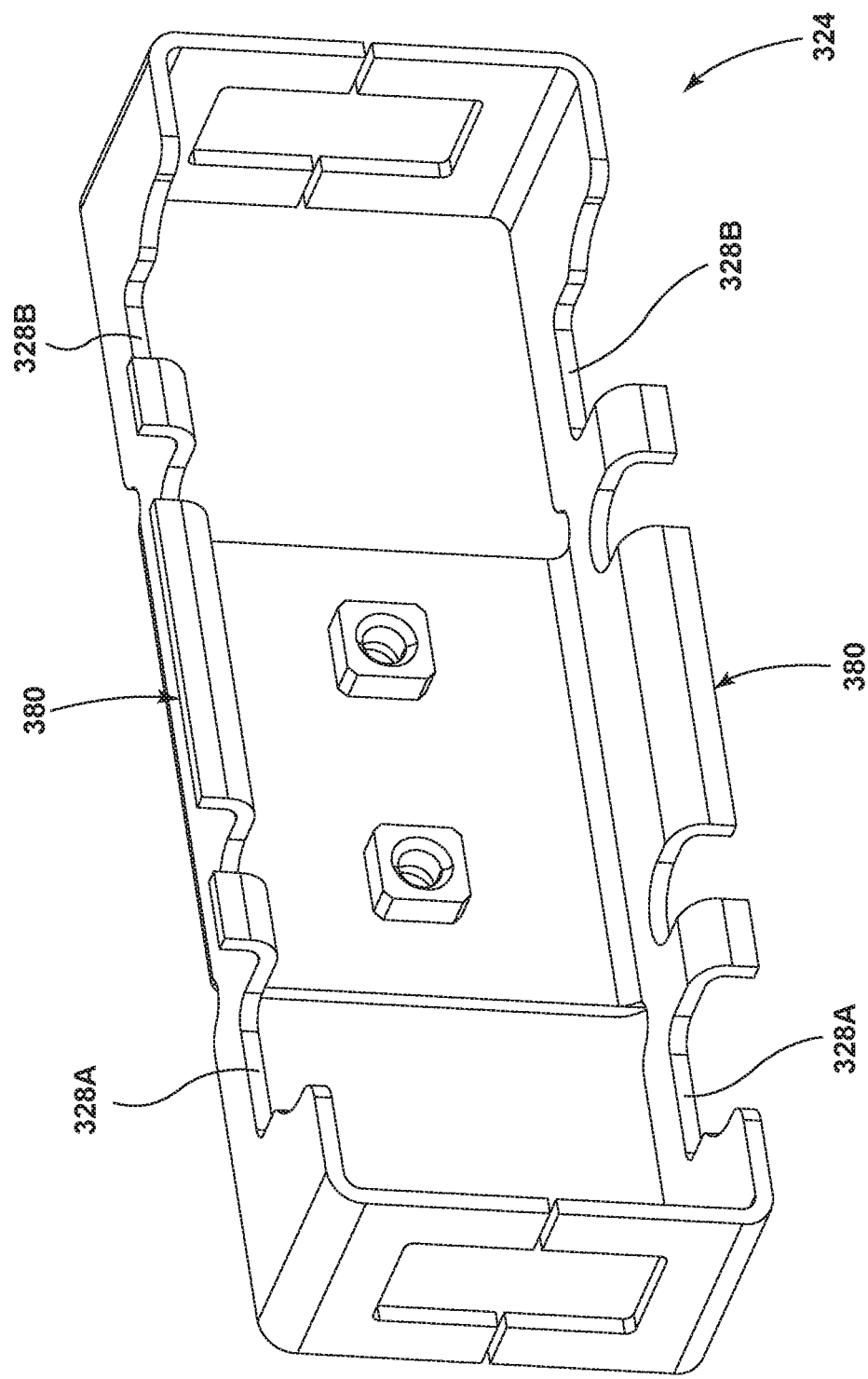

In embodiments, a bracket 224 may include one or more retainers 280 that may be configured to at least partially receive and/or retain connecting member 234. Retainers 280 may be configured as recesses and/or chambers. A bracket 224 may include a first portion 224A and a second portion 224B. The first portion 224A and the second portion 224B may cooperate to form or define one or more retainers 280 (e.g., each portion 224A, 224B may provide half of a retainer 280). Connecting members 234 and/or retainers 280 may be configured for connecting members 234 to be compressed, at least to some degree, within the retainers 280. For example and without limitation, one or more inner dimensions of a retainer 280 may be at least somewhat smaller than outer dimensions of a head 270 of a connecting member 234. A shape of a retainer 280 may correspond to the shape of a head 270. A damper assembly 220 may include one or more connectors 290 that may connect the first portion 224A with the second portion 224B. A connector 290 may include one or more of a variety of shapes, sizes, and/or configurations. For example and without limitation, a connector 290 may include a tube-shaped configuration, among other configurations. A damper 222 may include one or more movement limiters that may be configured in the same or a similar manner as movement limiters 32. A bracket 224 may include apertures and/or recesses that may correspond to the movement limiters and may be configured in the same or a similar manner as apertures 52 and/or recesses 54. The first portion 224A with the second portion 224B may include corresponding latch members 228 that may be configured for connecting the first portion 224A with the second portion 224B With embodiments, such as generally illustrated in FIGS. 16A, 16B, and 16C, a damper assembly 320 may include a damper 322 and a bracket 324. A damper 322 may include one or more movement limiters (e.g., movement limiters $332_1$, $332_2$) that may be configured to restrict movement of the damper 322 relative to the bracket 324. Movement limiters $332_1$, $332_2$ may be configured in the same or a similar manner as movement limiters 32. A damper 322 may include one or more connecting members (e.g., connecting members $334_1$, $334_2$, $334_3$, $334_4$) that may connect the damper 322 with the bracket 324. A damper 322 may include one or more recesses (e.g., recesses 326A, 326B). A bracket 324 may include or more recesses (e.g., recesses 328A, 328B). Recesses 326A, 326B, 328A, 328B may, for example and without limitation, be configured to at least partially receive posts 364A, 364B of a headrest 364, such as of a vehicle seat. Recesses 326A, 326B, 328A, 328B may extend in a direction substantially parallel to posts 364A, 364B, which may be substantially vertical (e.g., depending on the position of the seat). Recesses 326A, 328A may be disposed (e.g., in the Y-direction) between a first movement limiter $332_1$ and connecting members $334_1$, $334_2$. Connecting members Additionally or alternatively, recesses 326B, 328B may be disposed (e.g., in the Y-direction) between a second movement limiter $332_2$ and connecting members $334_3$, $334_4$. With embodiments, one or more connecting members (e.g., connecting members $334_1$, $334_3$ and/or connecting members $334_2$, $334_4$) may be connected and/or formed together. With embodiments, a bracket 324 may include one or more retainers 380 that may be configured for connection with multiple connecting members (e.g., connecting members $334_1$, $334_3$ and/or connecting members $334_2$, $334_4$).

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A damper assembly, comprising:
   a bracket;
   a body;
   a movement limiter extending from the body, the movement limiter including a plurality of ribs configured for contacting an inner surface of an aperture of the bracket to limit movement of the body relative to the bracket; and
   a plurality of connecting members extending from the body, the plurality of connecting members connecting the body with the bracket;
   wherein the bracket includes a first side wall, a second side wall, a third side wall, a fourth side wall, and a fifth side wall; the second side wall, the third side wall, the fourth side wall, and the fifth side wall extend from the first side wall; the aperture is disposed in one of the second side wall, the third side wall, the fourth side wall, and the fifth side wall; and the movement limiter is configured to restrict movement of the body toward the first side wall and away from the first side wall.

2. The damper assembly of claim 1, wherein the plurality of connecting members include a resilient material.

3. The damper assembly of claim 1, wherein the movement limiter includes a substantially triangular configuration.

4. The damper assembly of claim 1, wherein the plurality of connecting members includes four connecting members.

5. The damper assembly of claim 1, wherein a first connecting member of the plurality of connecting members extends from a first side of the body, a second connecting member of the plurality of connecting members extends from a second side of the body, and the first side is opposite the second side.

6. The damper assembly of claim 5, wherein the movement limiter extends from a third side of the body, and the third side is disposed substantially perpendicular relative to the first side and the second side.

7. The damper assembly of claim 1, wherein the movement limiter is configured to deform during insertion of the body into the bracket.

8. The damper assembly of claim 1, including a second movement limiter, wherein the movement limiter and the second movement limiter extend from opposite sides of the body.

9. The damper assembly of claim 1, wherein at least one of the plurality of connecting members includes a T-shaped configuration.

10. The damper assembly of claim 1, wherein, in an assembled configuration, the plurality of connecting members are not under a material amount of tensile strain to impart major deformation and/or fatigue.

11. The damper assembly of claim 1, wherein the body is not in contact with the bracket.

12. The damper assembly of claim 1, wherein the bracket includes one or more clips configured to at least temporarily connect the bracket with a mounting component, and the bracket includes one or more mounting portions configured to connect the bracket with said mounting component.

13. The damper assembly of claim 1, wherein the movement limiter extends through the aperture.

14. The damper assembly of claim 1, wherein the movement limiter extends in a Y-direction, the bracket includes a mounting portion that extends beyond the movement limiter in the Y-direction, and the mounting portion includes a threaded portion.

15. The damper assembly of claim 1, wherein the plurality of connecting members includes a first connecting member and a second connecting member that extend from a common side of the bracket, and the bracket includes a mounting portion disposed between the first connecting member and the second connecting member.

16. The damper assembly of claim 15, wherein the bracket includes a plurality of flexible mounting clips.

17. The damper assembly of claim 1, wherein the movement limiter is configured to impede or restrict movement of the body in more than one direction.

* * * * *